FIG. I.

United States Patent Office 3,591,451
Patented July 6, 1971

3,591,451
PRETREATMENT OF VEGETABLE MATTER AND DELIGNIFICATION OF THE REFINED MATTER WITH CHLORINE DIOXIDE
Harry D. Wilder, Richmond, Va., assignor to Ethyl Corporation, New York, N.Y.
Filed Feb. 6, 1969, Ser. No. 797,209
Int. Cl. D21c
U.S. Cl. 162—67                      22 Claims

ABSTRACT OF THE DISCLOSURE

A process for the delignification of chips of vegetable matter by pretreating the chips to obtain at least 64 percent by weight refined vegetable matter, and delignifying the refined vegetable matter with chlorine dioxide. A pulp produced in high yield by the process which refines easier, dries more readily on a paper machine, exhibits higher on-machine filler retention, and possesses greater strength than conventionally bleached kraft pulp made from the same wood mixture. A paper produced from said pulp which has higher tensile, tear, burst, fold, pick and delamination strengths and greater brightness stability than paper produced from conventionally bleached kraft pulp made from the same wood mixture.

BACKGROUND OF THE INVENTION

Vegetable materials such as wood, reed, bamboo, cane and the like which are or can be used for the preparation of fibrous materials are composed of several basic parts. In general, fibrous vegetable matter is made up of about 15 to 30 percent lignins and extractives, such as resins and the like, with the remainder of the about 70 to 80 percent being carbohydrates. The carbohydrate portion of the fibrous vegetable matter is about 10 to 30 percent hemicellulose with the remainder being cellulose, and the cellulose portion of the carbohydrate is about 45 to 55 percent alpha cellulose and about 5 percent other celluloses, all percentages being expressed on a wood basis.

As is well known, one of the first steps in conventionally converting fibrous vegetable materials to fibers for use in the preparation of paper or paper-like materials is a pulping process. The primary goal of the process is to remove most of the lignins from the fibrous vegetable material and separate the remaining carbohydrate fibers into individual fibers. In all known pulping processes, such as kraft, sulfite and others, when efforts are made to remove substantially all of the lignin from the vegetable fiber mass, a major part of the hemicellulose is lost, and the remaining cellulose and hemicellulose fibers are chemically and/or mechanically damaged. This results in a significant loss of yield and a major reduction in strength of paper or paper-like products due to fiber damage. For example, in a kraft pulping process, the normal yield known in the art is about 45 percent by weight. But, if only the lignins and extractives were removed from the fibrous vegetable material, the yield obtained would be 70–80 percent.

SUMMARY OF THE INVENTION

This invention is directed toward a new and novel pulping process and the pulp and paper products resulting therefrom. The pulping process removes substantially only lignins and extractives from fibrous vegetable materials and leaves the cellulose and hemicellulose part of the material substantially undamaged, thereby resulting in pulp and paper products having new and unusual properties and exceptionally high strengths. Since the pulping process is reasonably selective and substantially only the lignins and extractives are removed, yields are exceptionally high and in the 55 to 85 percent range. The pulping process includes a basic sequential unit of a chlorine dioxide treatment, caustic extraction and a chlorine dioxide treatment, and this basic unit is preceded by a chemical or mechanical pretreatment of prepared vegetable fiber chips. Each step of the basic sequential unit is followed by a water washing, which may be with process liquids obtained elsewhere in the process, as by countercurrent washing which has attendant conservation advantages.

A more preferred embodiment of the process is one including a chemical and/or mechanical pretreatment of prepared vegetable fiber chips followed by the sequential processing of the pretreated chips in a chlorine dioxide treatment, a caustic extraction, a chlorine dioxide treatment, a caustic extraction and a final chlorine dioxide treatment. A water washing or its equivalent follows each chlorine dioxide treatment and each caustic extraction.

An even more preferred embodiment of the process is one in which the water wash for the final chlorine dioxide treatment is used as the water wash for the preceding caustic extraction and so on countercurrently to the flow of fiber material through the process to the first water wash following the first chlorine dioxide treatment; from this point the wash water may then be sent to waste or treated for recovery of chemicals contained therein.

Another preferred embodiment of the process involves the chemical pretreatment of prepared vegetable fiber chips followed sequentially by a chlorine dioxide treatment, a caustic extraction, a chlorine dioxide treatment, a caustic extraction and a final chlorine dioxide treatment with countercurrent water washing and extraction after each treatment; the most preferred chemical pretreatment is a neutral sulfite pretreatment at a specified concentration of chemicals and cooking cycle.

The pulp produced by the process of the present invention has a higher degree of polymerization, a higher hemicellulose content, a higher carboxyl content, and a lower carbonyl content than conventionally bleached kraft pulp from the same wood mixture. In addition, it requires less energy to refine than a conventionally bleached kraft pulp from the same wood mixture. Also, laboratory handsheets prepared from the pulp have superior tensile strength and tear strength when compared to sheets of conventionally bleached kraft pulp from the same wood mixture.

The above pulp properties relate directly to paper made from the pulp. Such paper has higher tensile, tear, burst, fold, pick, and delamination strengths.

BRIEF DESCRIPTION OF THE DRAWING

In the drawing, FIG. 1 describes the basic process of this invention. FIG. 2 shows a more preferred embodiment of the process of this invention, and FIG. 3 discloses a highly preferred chemical pretreatment step for the process of this invention. FIG. 4 compares yield of pretreated material with caustic utilized in each stage. FIG. 5 compares G.E. brightness with caustic utilized in each stage. FIG. 6 compares percent rejects with caustic utilized. FIG. 7 shows final yield compared with pretreatment yield. FIG. 8 compares chlorine dioxide consumption with pretreatment yield. FIG. 9 shows a comparison of freeness with beating time. FIG. 10 compares Schopper fold with effect of cation treatment. FIG. 11 provides a comparison of MIT fold with Schopper fold. FIG. 12 relates to Schopper fold to days of aging, and, FIG. 13 relates Schopper fold to years of aging.

DESCRIPTION OF THE PREFERRED EMBODIMENTS

Figure 1:
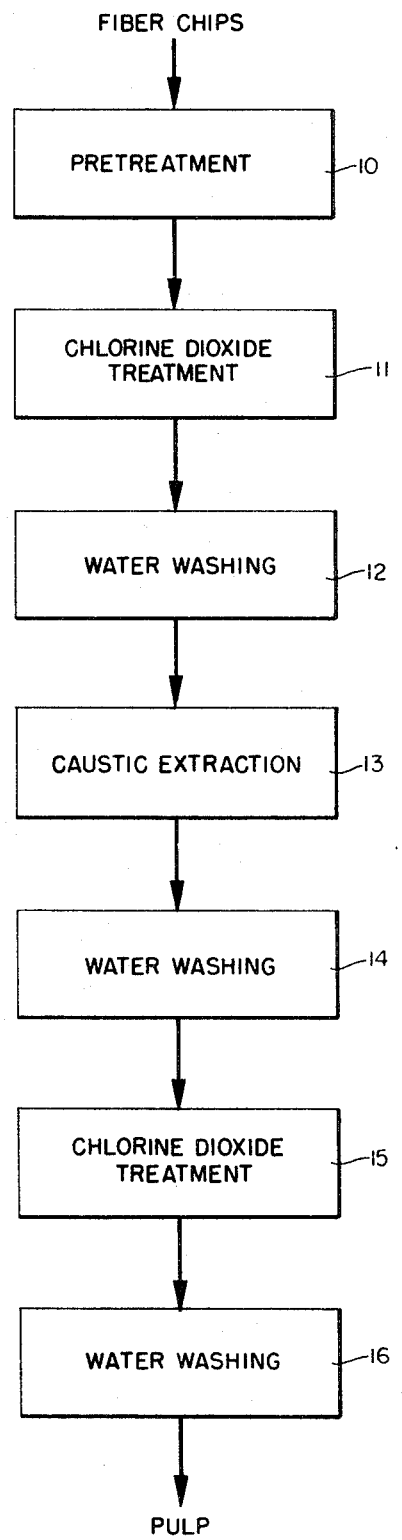
FIGS. 1 to 3 are block diagrams and FIGS. 4 to 13 are graphs.

Referring now to FIG. 1, fiber chips of any fibrous vegetable matter are fed first to a pretreatment step 10 which may be either mechanical, chemical or a combination thereof. Following pretreatment, the pretreated chips are then fed to a first chlorine dioxide treatment 11 where they are contacted with chlorine dioxide in either aqueous solution or as a gas. Following this, the chlorine dioxide treated material is washed with water 12 to return the mixture to substantially neutral pH; following washing, the washed chlorine dioxide treated material is subjected to caustic extraction 13 for a period of about one-half to one hour. The extracted material is washed again with water to return to substantially neutral pH, as indicated at 14, and to remove the water soluble materials produced in the extraction step. Then this second washed, extracted fibrous material is subjected to a second chlorine dioxide treatment 15, either aqueous or gaseous, and the second chlorine dioxide treated material is water washed, 16, to produce a pulp in high yield with good brightness. Yields from this basic process range from about 55 to about 85 percent at a G.E. color brightness (TAPPI Standard T217m-48) of approximately 80 to 90.

Figure 2:
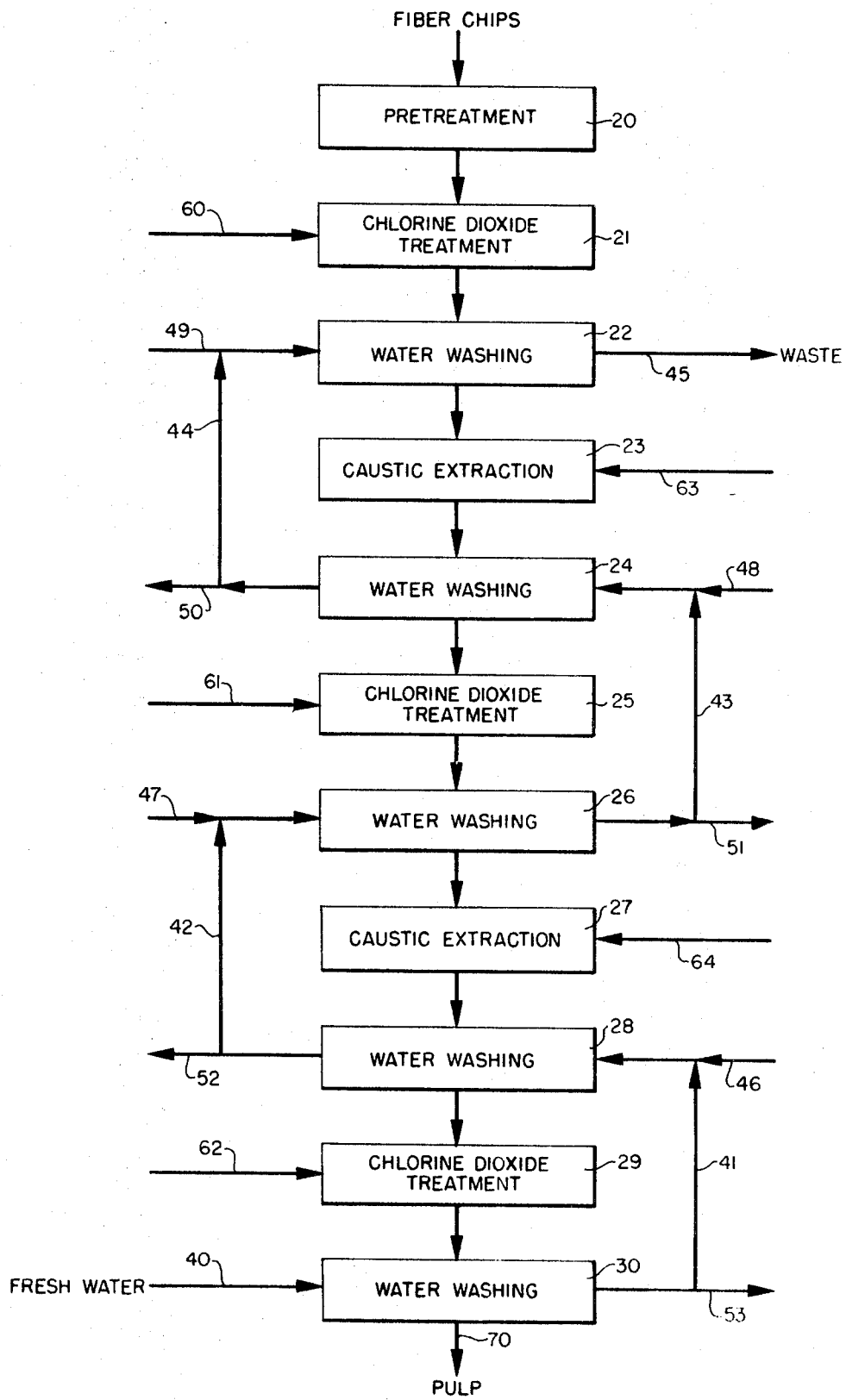

Referring now to FIG. 2, a more preferred embodiment of the invention is shown. Prepared vegetable fiber chips are fed to a pretreatment step 20 where they are subjected to a chemical, mechanical or a combined chemical-mechanical pretreatment to make the lignin and extractives more readily available for removal. Following the pretreatment step, the pretreated material is subjected sequentially to a chlorine dioxide treatment 21, water washing 22, caustic extraction 23, water washing 24, chlorine dioxide treatment 25, water washing 26, caustic extraction 27, water washing 28, chlorine dioxide treatment 29, and water washing 30.

In a more preferred embodiment, fresh water is fed only to the last water washing 30 by line 40 and then circulated countercurrently to the flow of the material through the process as indicated by line 41 to the next to last water washing step 28, and from there as indicated by line 42 to the next preceding water washing step 26, then by line 43 to water washing step 24, and from that wash to the first water washing 22 as indicated by line 44, and then to waste or chemical recovery as indicated by line 45. It is clear, of course, that fresh or make-up water may be added to any one of the water washing steps as indicated by lines 46, 47, 48, 49 and that water may be sent to waste or chemical recovery from any or all of the water washing steps as indicated by lines 50, 51, 52 and 53.

Chlorine dioxide, either in aqueous solution or in gaseous form, may be fed to each of the chlorine dioxide steps as indicated by lines 60, 61 and 62 and an aqueous solution of caustic may be fed to each of the caustic extraction steps as indicated by lines 63 and 64. The novel pulp of this invention is recovered from the process, as indicated at 70, in a high yield of about 55 to about 85 percent and at a G.E. brightness of approximately 80 to 90.

A more preferred embodiment of the invention is a five stage process that comprises the sequential steps of chlorine dioxide treatment, caustic extraction, chlorine dioxide treatment, caustic extraction, and chlorine dioxide treatment, with a water wash between each step, and having first chlorine dioxide treatment preceded by chemical or a chemical-mechanical pretreatment.

Figure 3:
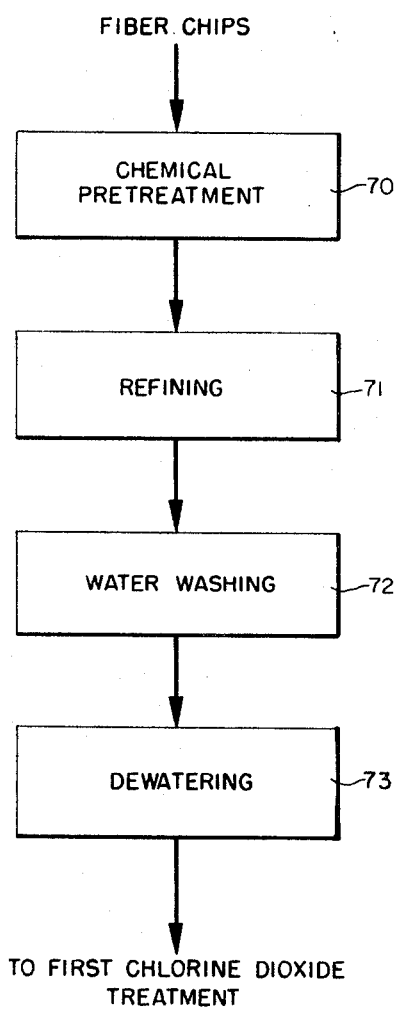

Referring now to FIG. 3, a block diagram of a preferred chemical-mechanical pretreatment is shown. Prepared vegetable fiber chips are fed to a chemical treatment step 70 where a prepulping treatment is given. This prepulping treatment may be in the nature of a weak pulping to a high yield by a kraft, nitric acid, neutral sulfite process, or other. In the pre-pulping treatment, the fiber chips are prepulped to a yield at least greater than 64 ercent by weight based upon the dry weight of the chips of the vegetable matter. Following the chemical treatment, the prepulped material is refined in step 71, washed in step 72, then dewatered as indicated at 73 to prepare a combined chemically-mechanically pretreated material ready for processing in the first chlorine dioxide treatment as indicated at 21 in FIG. 2.

The novel process of this invention is suitable for preparing a novel pulp and paper product from any fibrous vegetable matter containing lignin. As is necessary with all pulping processes, the vegetable matter should have extraneous materials removed before being subjected to the process. For example, in the case of wood, it must be debarked in a prior operation. In the following description, wood will be referred to as the fibrous vegetable material; however, it should be understood that the process of the invention is applicable to all fibrous vegetable materials.

Debarked wood, either hard or soft, may be converted into chips by a Carthage multiknife chipper or other equivalent apparatus. The chips should be approximately 15 to 75 millimeters in length, 10 to 40 millimeters in width and have a thickness of 0.5 to 20 millimeters. When chemical or chemical-mechanical pretreatment is used it is preferred that chips have an approximate length and width as described and that the thickness be from about 2 to about 5 millimeters. Following chipping, prepared chips are then subjected to the pretreatment step.

The pretreatment step can be either mechanical, chemical or a combination of chemical and mechanical. In mechanical pretreatment, the vegetable fiber chips are subjected to a shredding, refining, or flaking operation, such as is well known in the art, by a Pallman knife ring flaker, which by slicing reduces conventionally sized chips to thin flakes while maintaining chip length and width, or a standard disc refiner, or the equivalent. As is also known, the chips may be subjected to water or steam treatment prior to flaking or refining, either under vacuum or pressure, and following either flaking or refining the resulting fibers or fiber bundles should be as small as possible without significant damage to the fibers. The optimum size depends upon the flaking or refining equipment employed. When chemical pretreatment is used, the vegetable fiber chips are subjected to a chemical treatment followed by a refining operation and then a water washing. The chemical pretreatment results in a yield of at least about 64 percent or greater and may be a mild prepulping by a neutral sulfite, nitric acid, kraft or other known pulping process (e.g., bisulfite, acid sulfite, cold soda, soda, sodium xylene sulfonate, polysulfide). A more preferred chemical pretreatment is a mild neutral sulfite prepulping under particular conditions of chemical concentrations; the heating and cooking cycles are defines infra.

The refining step may be performed by standard disc refiner or other equivalent apparatus and conducted to yield minimum particle size without significant fiber damage. After either the chemical or mechanical pretreatment, a dewatering step may be necessary prior to subjecting the pretreated fibers to the novel pulping process of this invention.

It has been found that when using a chemical pretreatment in preference to only a mechanical pretreatment, the amount of fines produced in the refining is reduced, the optimum diameter of the fiber bundles produced is reduced, the energy input to the refining operation is reduced, the quantity of chlorine dioxide necessary for pulping to a desired brightness is reduced, the quality of the final pulp from the novel process is improved, and the yield of the pulp from the final process is increased.

Following pretreatment, either mechanical or chemical, as the case may be, the preteated material enters the first chlorine dioxide treatment step. In this step the shredded mass of fiber bundles resulting from the pretreatment has a consistency of from about 5 percent to about 50 percent by weight, based on the total weight of shredded mass and water. Chlorine dioxide, if used as an aqueous solution, may be fed as an approximately 1 percent by weight aqueous solution, and depending upon the desired concentration of chlorine dioxide, which is defined infra, additional water may be added to prepare the mixture to the desired consistency. If gaseous chlorine dioxide is used, an inert diluent such as air may be necessary to prevent explosion hazards.

Any conventional treating tower such as is well known in the art may be used for the chlorine dioxide treatment stage and heat may be added if and as necessary. Also, additional heat may be supplied to reduce the time of contact between the shredded mass and the chlorine dioxide, which time is from about 10 minutes to 2 hours depending upon the consistency, the temperature, and the yield of product resulting from the pretreatment step. In general, the shredded mass of fibers is permitted to remain in contact with the chlorine dioxide until the chlorine dioxide charged is substantially consumed. The pH of this system at the beginning may vary from about 4.0 to about 8.0, and upon consumption of the chlorine dioxide the pH of the treated solution will be approximately 0.5 to 3.0. Following the chlorine dioxide treatment, the resulting mass is then water washed in a conventional vacuum drum washer or the equivalent.

Following the first water washing, and when the material has a substantially neutral pH, the washed material is subjected to a first alkali extraction in a conventional treating tower such as is well known in the art. In the alkali extraction, any water soluble caustic material may be used such as sodium hydroxide, ammonium hydroxide, sodium carbonate, ammonia gas or other or mixtures of these or others; however, an aqueous solution of sodium hydroxide is preferred. In the extraction, the alkali application should be approximately 4 percent based on the oven dry weight of the fibrous material, and sufficient water may be added or removed to prepare an aqueous fiber mass having a consistency of from about 5 percent to about 50 percent by weight based on the total weight of shredded mass present and water. The alkali extraction should continue for at least about one-half hour at a temperature of from about 50° C. to about 75° C. with a preferred temperature of about 65° C. Following alkali extraction, the alkali extracted material is subjected to another water washing under substantially the same conditions as the first water wash to remove extracted materials and residual chemicals.

The second chlorine dioxide treatment may be carried out in a conventional treating tower such as described for the first chlorine dioxide treatment, whereby the desired consistency of material within the tower is substantially the same for the second chlorine dioxide treatment as for the first. Either gaseous chlorine dioxide or an aqueous, approximately one percent by weight, solution may be fed to this second treatment stage. In this stage the pH is initially from about 4.0 to about 8.0 and ends at about 2.0; the chlorine dioxide treatment is permitted to continue until substantially all the chlorine dioxide charged to the treating stage is consumed. The temperatures for the second chlorine dioxide treatment are adjusted to from about 40° C. to about 60° C. to keep contact times to a minimum of from about 30 minutes to about 4 hours to consume the chlorine dioxide charged. Following the second chlorine dioxide treatment, the treated material is subjected to a third water washing under substantially the same conditions as the first and second water washings. After the third water wash, a second alkali extraction is conducted, followed by a water wash under substantially the same conditions as the first alkali extraction and wash. The washed material at this stage in the process may be screened, if desired, to remove any shives of fibrous material which may remain, and these shives are discarded or returned to the first chlorine dioxide treatment stage for recycle.

The treated material, whether screened or not, is then subjected to a third chlorine dioxide treatment under the same conditions of consistency and chlorine dioxide concentration as the first and second chlorine dioxide treatment stages for a period of from about 2 hours to about 6 hours, depending upon the desired brightness for the product produced. The temperature for this third chlorine dioxide treatment stage is from about 40° C. to about 80° C., and following the third chlorine dioxide treatment, the treated material is subjected to a fifth and final water wash under the same conditions as the preceding water washings.

The total concentration of chlorine dioxide used in the multistage process, whether two, three or more chlorine dioxide stages, is dependent upon the yield of product obtained from the pretreatment step and the desired brightness of the product resulting from the final treatment stage. In general, the total chlorine dioxide consumed in the multiple stages, regardless of the number of stages used, is from about 1.0 to about 15.0 percent by weight based on the total dry weight of fibrous material being fed to the pretreatment stage. It has been found and is preferred that the total concentration of chlorine dioxide used is from about 4.0 percent to about 13.0 percent by weight, based upon the total weight of dry fibrous material being fed to the pretreatment stage.

The amount of chlorine dioxide fed to each chlorine dioxide stage is dependent upon the number of chlorine dioxide stages used and on the pretreatment yield. For any given total amount of chlorine dioxide to be used, it has been found that approximately two times the amount used in the last stage should be fed to the chlorine dioxide stage preceding the last and two times the amount used in the preceding stage fed to the next preceding stage, and so on. For example, in a three chlorine dioxide stage process, this means that approximately four-sevenths of the total chlorine dioxide will be fed to the first stage, approximately two-sevenths of the total chlorine dioxide will be fed to the second stage, and approximately one-seventh to the third stage.

As mentioned previously, the preferred pretreatment for the process of this invention is a chemical pretreatment, and of the chemical pretreatments available such as kraft, bisulfite, neutral sulfite, nitric acid, etc., a neutral sulfite pretreatment is preferred. And, among the neutral sulfite pretreatments available, a sodium based neutral sulfite pretreatment is preferred. As well known in the art, a standard neutral sulfite pulping treatment includes cooking fibrous vegetable material for a period of 10 to 15 minutes at about 350° F. in a concentration of approximately 10 percent sodium sulfite and approximately 3 percent sodium carbonate, chemical charges being based on the wood weight charged to the process. Although this standard neutral sulfite pretreatment has advantages, in the process of this invention it is even more preferred that a specific and novel neutral sulfite pretreatment be used. This novel chemical pretreatment includes preparing an aqueous solution of a fibrous vegetable material, which has been chipped as described previously, with a concentration of from about 5 to about 30 percent sodium sulfite and from about 3 to about 25 percent sodium carbonate to provide a sodium sulfite to sodium carbonate ratio of about 1.2 or greater. More preferred concentrations are from about 7 to about 20 percent sodium sulfite and from about 5 to about 18 percent sodium carbonate, all percentages being based upon the dry weight of the vegetable matter. A more preferred sodium sulfite to sodium carbonate ratio is from about 1.2 to about 1.5. The time-temperature relationship employed is designed to give adequate impregnation of liquor into chips prior to reaching a temperature of about 300° F. This relationship is dependent upon wood species and chip size, as well as previous chip history. When a chemical pretreatment is performed in accordance with the described recipe, higher final yields and higher quality product are obtained as compared with other mechanical or chemical pretreatments.

In the following description, all evaluations of paper and pulp products were made, unless otherwise indicated, at a standard basis weight of 40 pounds per 3000 square feet.

The pulp of the present invention is chemically unique in that it has a higher degree of polymerization, a higher hemicellulose content, a higher carboxyl content, and a lower carbonyl content than pulp conventionally produced from the same wood. Due it its higher final yield as compared to conventionally bleached kraft pulp, it contains more hemicellulose. At the same time, however, the viscosity average degree of polymerization of the pulp is higher than that of conventionally bleached kraft pulp. The inescapable conclusion is that the process of the present invention degrades wood cellulose less than conventional processes in going from wood to purified pulp. Thus, the carboxyl content of the pulp produced by the present invention is at least twice as great as the carboxyl content of conventionally bleached pulps and has a carboxyl number (TAPPI Standard T237su–63) greater than about 6, preferably greater than about 9, and more preferably greater than about 12, and as high as, for example, 20, and even higher. At the same time, the carbonyl content is only one-half to one-third as great as the carbonyl content of conventionally bleached pulp from the same wood.

It is well established that the brightness stability of a pulp is related to the carbonyl content of the pulp. The higher the carbonyl content, the greater the brightness loss during aging. Since the product of the present invention possesses a very low pulp carbonyl content, it is quite stable and loses little brightness with aging. By comparison, the higher carbonyl content of pulps not produced by the present invention result in rather poor brightness stability.

The mechanical properties of the pulp of the present invention which are affected by its unique chemical properties are ease of refining, fiber tensile strength, and ability to form fiber-fiber bonds when made into sheets and dried. The pulp of the present invention consumes only one-third to one-fourth of the energy required to beat a conventionally bleached kraft pulp from the same wood mixture to the same freeness level. The rate of beating of the pulp of the present invention is 4.2 times as great as the rate for the corresponding bleached kraft pulp when prepared from a northern hardwood mixture and 3 times as great using the southern hardwood mixture. Since the time required to beat a pulp is directly proportional to the energy required to beat that pulp, the pulp of the present invention exhibits a substantial savings in refining energy input required to reach a given freeness level. The rate of mechanical refining (ml. Canadian St. per minute of beating carried out according to TAPPI Standard T200ts–66) can be greater than about 15, preferably greater than about 20, more preferably greater than about 25, and may extend up to, for example, 50 and even higher. When the pulp of the present invention is formed into paper on a paper machine, more rapid drainage, increased ability to retain fibers, increased wet web strength, and increased drying rate are observed relative to conventional pulp prepared from the same wood.

Strips of handsheets from the pulp of the present invention possess superior tensile strength and tear strength when compared to conventionally bleached kraft pulp from the same wood mixture. This is unusual since pulps with higher tensile strength usually possess lower tear strength. The fact that the present pulp possesses both a superior tear strength and superior tensile strength indicates another unique physical property of the pulp of this invention; it also possesses superior individual fiber tensile strength.

The properties of these pulps relate directly to papers made from them. Machine made paper from pulp of the present invention produces higher tensile, tear, burst, fold pick and delamination strengths. The grease proofness (TAPPI Standard T454ts–66) of the paper of this invention can be greater than about 500 sec., preferably greater than about 1000 sec., and can extend up to, for example, 1800 sec. and even higher; tensile strength (TAPPI Standard T404ts–66) for paper from hardwood pulp can be greater than about 80 percent, preferably greater than about 100 percent, more preferably greater than about 120 percent and may extend up to, for example, 200 percent and even higher, and for paper from softwood pulp it can be greater than about 120 percent, preferably greater than about 140 percent, more preferably greater than about 160 percent, and may extend up to, for example, 250 percent and even higher; bursting strength (TAPPI Standard T403ts–63) for paper from hardwood pulp can be greater than about 140 percent, preferably greater than about 160 percent, more preferably greater than about 190 percent, and may extend up to, for example, 250 percent and even higher, and for paper from softwood pulp it can be greater than about 160 percent, preferably greater than about 190 percent, more preferably greater than about 230 percent, and may extend up to, for example, 300 percent and even higher; tearing resistance (TAPPI Standard T414ts–65) for paper from hardwood pulp can be greater than about 160 percent, preferably greater than about 220 percent, more preferably greater than about 300 percent, and may extend up to, for example, 400 percent and even higher, and for paper from softwood pulp it can be greater than about 320 percent, preferably greater than about 370 percent, more preferably greater than about 420 percent, and may extend up to, for example, 600 percent and even higher; folding endurance (MIT fold, TAPPI Standard T423su–68) for paper from hardwood pulp can be greater than about 500, preferably greater than about 100, more preferably greater than about 1500, and may extend up to, for example, 3000 and even higher, and for paper from softwood pulp it can be greater than about 1000, more preferably greater than about 1500, and preferably greater than about 4000, and may extend up to, for example, 6000 and even higher.

The novel process of this invention may be understood better by reference to the following examples; however, it should be understood that these examples are intended to be descriptive rather than restrictive.

EXAMPLE I

To demonstrate the advantage of using multiple chlorine dioxide-caustic extraction stages in delignification as opposed to a single chlorine dioxide stage, experiments were carried out using finely ground southern hardwood meal, which was then reacted with aqueous chlorine dioxide solutions at an initial pH 4 and at 70° C. for a reaction time of one hour, which led to complete consumption of the chlorine dioxide.

Following the reaction-extraction sequence, overall yield and lignin content (Klason) were determined in relation to each sample. Carbohydrate content was calculated by difference. Two factors were then defined:

$$E = \text{efficiency factor} = \frac{\text{grams Klason lignin removed}}{\text{grams chlorine dioxide applied}};$$

and $$R = \text{carbohydrate retention factor}$$
$$= \frac{\text{grams carbohydrate retained}}{\text{grams carbohydrate initially present}}.$$

Optimum condtions result with a high value of E, while maintaining an R value as close to unity as possible. By comparison, a bleached hardwood kraft pulp would have an R value of approximately 0.55.

The table below shows the results of these experiments for a single chlorine dioxide stage, a single stage followed by an extraction, and a three-stage sequence. It will be noted that the inclusion of the extraction stage (second case) more than doubles the efficiency while not greatly reducing the retention or selectivity factor. Since the product following any extraction stage is very dark, a final chlorine dioxide stage is required to produce a bleached product. The high E and relatively high R values are maintained through this second chlorine dioxide stage, demonstrating the superiority of the multistage approach.

| Reaction sequence | Overall yield, percent | E | R |
|---|---|---|---|
| 5% chlorine dioxide | 94 | 1.0 | 0.99 |
| 5% chlorine dioxide–0.05 normal sodium hydroxide extraction | 77 | 2.5 | 0.87 |
| 5% chlorine dioxide–0.05 normal sodium hydroxide extraction–5% chlorine dioxide | 72 | 2.0 | 0.89 |

With the chlorine dioxide-extraction-chlorine dioxide sequences shown above, the resultant product is not of as high a brightness as it is possible to achieve. Also, when a three-stage sequence is applied to a fibrous material obtained from either a mechanical or chemical-mechanical pretreatment of wood (as opposed to the fine wood meal referred to above), the resulting pulp contains some shives of fiber bundles. Use of more chlorine dioxide in each of the two stages as well as use of a more severe extraction stage improves results. However, this leads to an increase in chlorine dioxide consumption and a decrease in R. Thus, the preferred method of producing a bleached pulp with a negligible quantity of shives is conducted by expanding the sequence to five stages of intermittent chlorine dioxide-extraction (with intermediate washing). The additional stages give the caustic an additional opportunity to soften and disperse the fiber bundles, and also to remove further alkali-soluble lignin materials and thereby reduce the overall chlorine dioxide consumption.

EXAMPLE II

To demonstrate the preferred distribution of chlorine dioxide between stages, hardwood chips were pretreated chemically by a sodium base neutral sulfite reaction to approximately 85 percent yield, followed by mechanical refining in an eight inch laboratory disc refiner and thorough water washing.

Representative samples of the resultant pretreated material were subjected to various chlorine dioxide extraction sequences. The following conditions were held constant during these tests.

First chlorine dioxide stage:
   10% consistency; reaction to exhaustion;
First caustic stage:
   4% sodium hydroxide based on pulp; 12% consistency; 65° C. extraction for one hour;
Second chlorine dioxide stage:
   10% consistency; 65° C. reaction to chlorine dioxide exhaustion;
Second caustic stage:
   Same conditions as in first caustic stage;
Third chlorine dioxide stage:
   Same conditions as in second chlorine dioxide stage.

Water wash was employed after all stages. First, the distribution between the first two chlorine dioxide stages was studied by five combinations of chlorine dioxide in these stages, holding the total amount applied constant at five percent, based on starting pretreated material, eliminating the final (third) chlorine dioxide stage and making yield and lignin determinations. The results are shown below:

| Run | Chlorine dioxide applied, first stage | Chlorine dioxide applied, second stage | Percent yield | Percent lignin [1] |
|---|---|---|---|---|
| 1 | 1.0 | 4.0 | 85.4 | 14.2 |
| 2 | 2.0 | 3.0 | 86.0 | 10.6 |
| 3 | 2.5 | 2.5 | 86.4 | 8.7 |
| 4 | 3.0 | 2.0 | 86.8 | 8.8 |
| 5 | 4.0 | 1.0 | 86.3 | 8.9 |
| Base | 0 | 0 | 100 | 18.7 |

[1] TAPPI Standard T 222 m–54.

From the above table, it is apparent that maximum delignification is achieved with at least half of the applied chlorine dioxide being used in the first stage. A maximum yield is indicated with about twice as much chlorine dioxide in the first stage as in the second.

This type of experiment was repeated using the five-stage sequence (chlorine dioxide-extraction-chlorine dioxide-extraction-chlorine dioxide), with a constant application of four percent chlorine dioxide in the first stage and five percent distributed between the second and third chlorine dioxide stages as shown below. In all cases, chlorine dioxide application percentages are based on starting pretreated material.

| Run | Chlorine dioxide applied, second chlorine dioxide stage | Chlorine dioxide applied, third chlorine dioxide stage | Percent yield | Percent lignin [1] |
|---|---|---|---|---|
| 1 | 1.0 | 4.0 | 82.0 | 10.8 |
| 2 | 2.0 | 3.0 | 81.2 | 5.0 |
| 3 | 2.5 | 2.5 | 79.0 | 4.1 |
| 4 | 3.0 | 2.0 | 78.0 | 3.9 |
| 5 | 4.0 | 1.0 | 77.9 | 3.6 |

[1] TAPPI Standard T 222 m–54.

The lignin data from the above table again show conclusively that optimum practice calls for more than one-half the five percent chlorine dioxide to be applied in the second chlorine dioxide stage; there is no significant change in lignin free yield between Runs 4 and 5.

From these two comparisons, it is apparent that from the standpoint of minimizing chlorine dioxide consumption and maximizing lignin-free (bleached) yield, the total chlorine dioxide application should be distributed between stages in the approximate proportions of four-sevenths in stage one, two-sevenths in stage two, and one-seventh in stage three.

EXAMPLE III

To demonstrate the advantage of using sodium hydroxide rather than sodium carbonate or ammonium hydroxide in the extraction stages, the following comparisons were made, demonstrating that sodium hydroxide is more effective in extracting lignin reaction products than either sodium carbonate or ammonium hydroxide. At the same time, sodium hydroxide is at least as effective as the other two extractants in preserving pulp carbohydrate content.

The first runs below compare sodium hydroxide and sodium carbonate as extractants. Mixed southern hardwood chips were pretreated chemically by a neutral sulfite treatment and mechanically in a laboratory disc refiner to a final pretreatment yield of 84 percent. Following thorough water washing, the pretreated material was pulped with 5.5 percent chlorine dioxide (wood basis), extractions were carried out at 10 percent consistency and 65° C., and the effect of variable extraction conditions was determined through yield and lignin content measurements on the washed pulp. The extraction conditions used and experimental results were as follows:

| Chemical | Amt., percent of pulp | Equiv. amt. of sodium hydroxide | Extraction time, hrs. | Yield, percent pretreated material | Lignin,[1] percent pretreated material | Carbohydrate, percent pretreated material |
|---|---|---|---|---|---|---|
| NaOH | 4 | 4 | 1 | 79.8 | 2.1 | 77.7 |
| Na₂CO₃ | 5.6 | 4.2 | 1 | 83.3 | 5.3 | 78.0 |
| Na₂CO₃ | 5.6 | 4.2 | 4 | 80.4 | 4.1 | 76.3 |

[1] TAPPI Standard T 222 m-54.

It is evident that equal extraction time results in a much lower lignin extraction efficiency with the carbonate than with the hydroxide. Also, the hydroxide removes no more carbohydrate than does the carbonate. An increase in carbonate extraction time increases the lignin extraction efficiency, but does not give results equivalent to hydroxide. Longer carbonate extractions result in increased carbohydrate extraction, which is undesirable.

Similar runs were made using ammonium hydroxide and sodium hydroxide. The starting material was a 73 percent neutral sulfite-disc refiner pretreated hardwood mixture, with a 4 percent chlorine dioxide pulping stage preceding the extractions. The extraction conditions and results are shown below.

| | Sodium hydroxide extraction | Ammonium hydroxide extraction | Ammonium hydroxide extraction |
|---|---|---|---|
| Extraction consistency, percent | 12 | 20 | 20 |
| Extraction time, minutes | ([1]) | 5 | 5 |
| Extraction temperature, °C | 65 | 100 | 100 |
| Extractant applied, percent of pretreated material | 4 | 8 | 4 |
| Extractant applied, equivalent sodium hydroxide, percent | 4 | 9 | 4.5 |
| Yield, percent pretreated material | 86.2 | 87.2 | 87.7 |
| Lignin, percent pretreated material [2] | 3.0 | 3.8 | 4.6 |
| Carbohydrate, percent pretreated material | 83.2 | 83.4 | 83.1 |

[1] 1 hour.
[2] TAPPI Standard T 222 m-54.

It is apparent from these results that ammonium hydroxide extraction, even at the higher level of chemical application, is less efficient in lignin extraction. Also, ammonium hydroxide offers no advantage in carbonhydrate preservation.

EXAMPLE IV

To demonstrate the preferred conditions of temperature and applied alkali to be used in the caustic extraction stages of the chlorine dioxide-extraction sequence, a pretreated wood such as produced in Example X was delignified using the following four-stage sequence.

First chlorine dioxide stage:
 5% chlorine dioxide (wood basis), 10% consistency, one hour;

First extraction stage:
 12% consistency; temperature and sodium hydroxide applied to be optimized;

Second chlorine dioxide stage:
 2.5% chlorine dioxide (wood basis), 10% consistency, one hour at 65° C.;

Second extraction stage:
 Same conditions as used in first extraction stage.

Water wash was employed after each of the above. The resulting pulps were analyzed for yield, G.E. brightness (TAPPI Standard T 217m–48), and screen rejects (amount retained on a 0.006-inch laboratory vibratory flat screen). The results for two extraction temperatures (20 and 65° C.) and an applied alkali ranging from one to six percent (pulp basis) are shown in the drawing in FIG. 4 (yield), FIG. 5 (brightness), and FIG. 6 (rejects).

Figure 4:
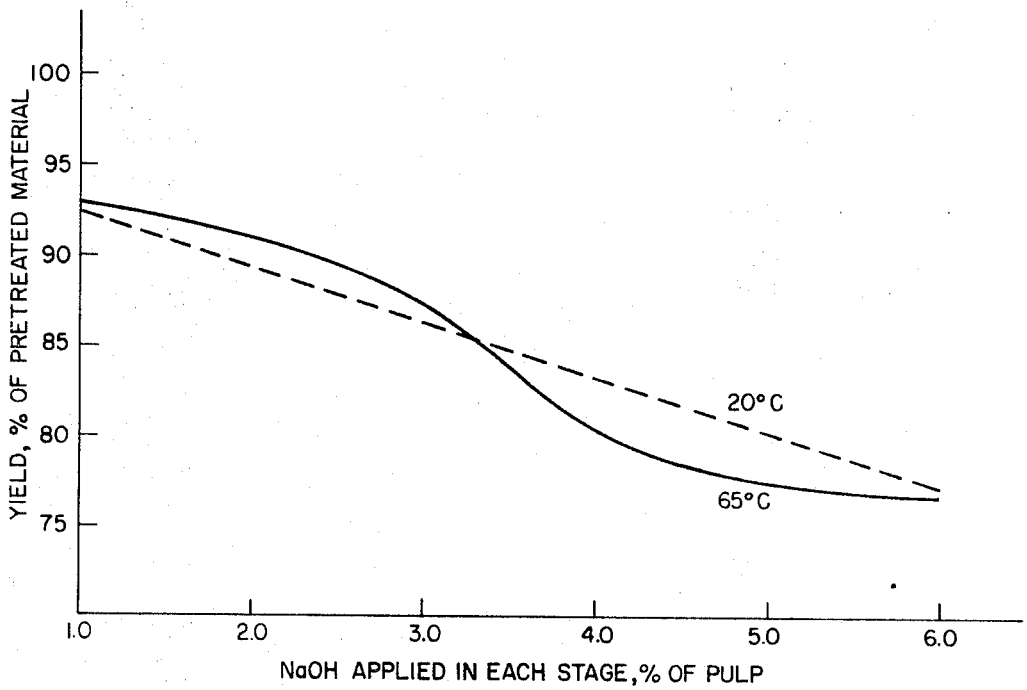
Figure 5:
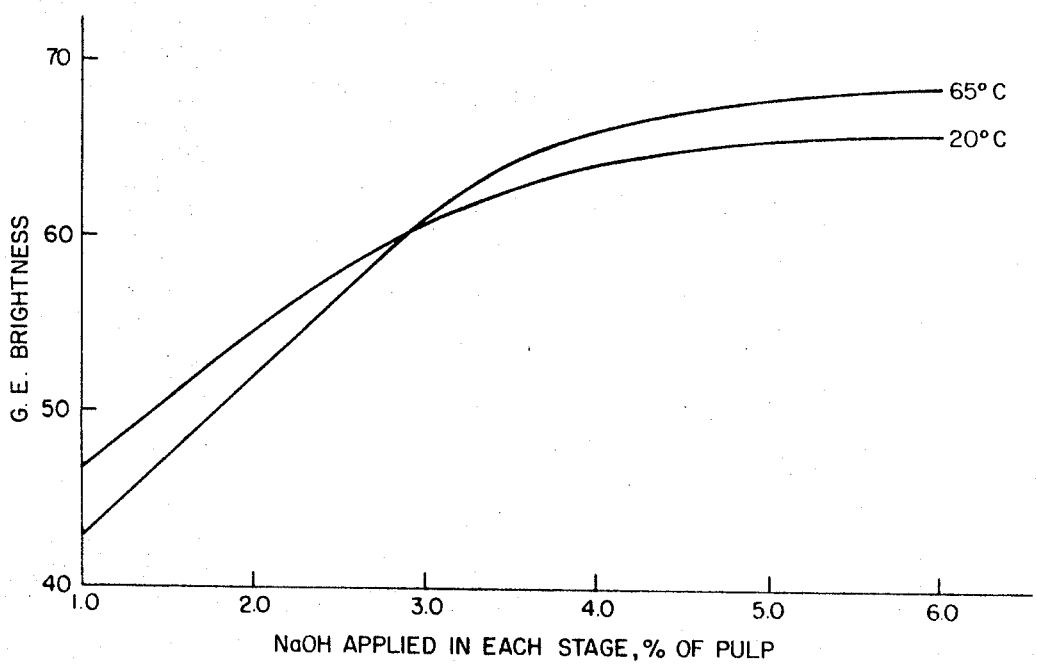
Figure 6:
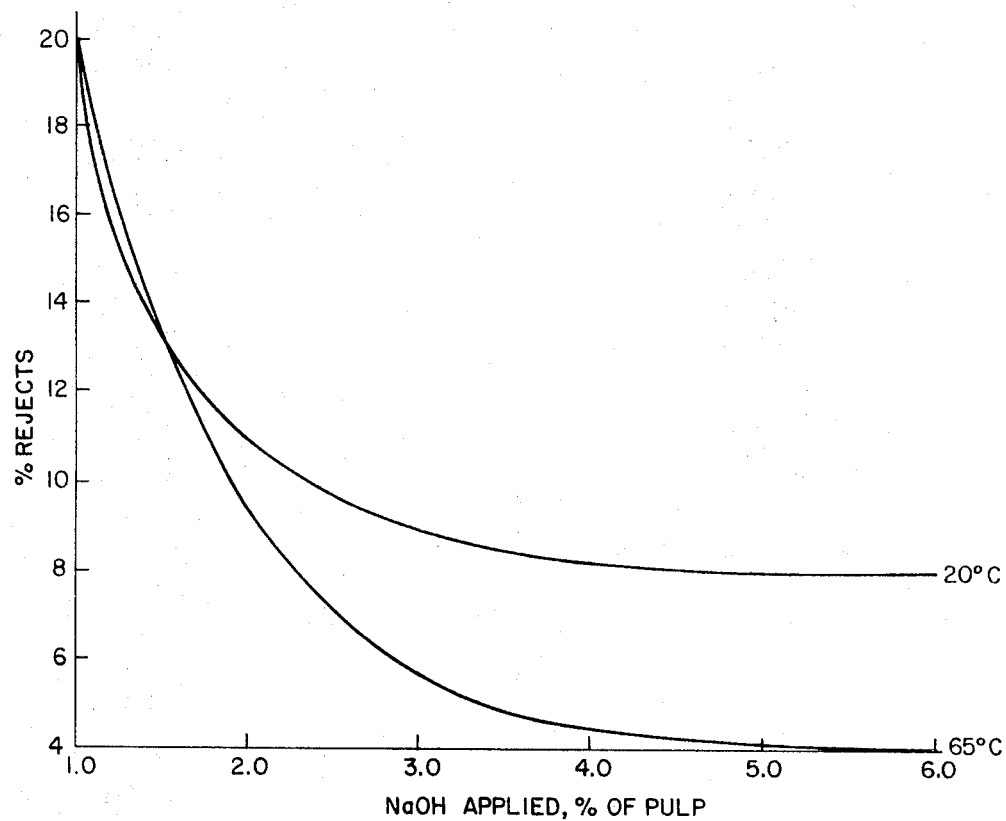

FIGS. 4 and 5 show that yield losses and brightness are relatively little affected by temperature. However, while yield loss is approximately proportional to alkali applied, there is little advantage in either brightness increase or rejects reduction in using more than about 4 percent sodium hydroxide at 12 percent consistency. Therefore, to conserve yield while achieving maximum brightness and minimum rejects, about 4 percent applied caustic is employed at 12 percent consistency. FIG. 6 clearly shows that a higher temperature (65° C.) is advantageous in reducing rejects. Since this does not adversely affect yield, preferred temperature conditions for extraction are above ambient, in the vicinity of 65° C.

EXAMPLE V

To show the preferred range of sodium base neutral sulfite pretreatment yield, a series of sodium base neutral sulfite pretreatments was carried out. In all cases, sufficient (and constant between runs) liquor impregnation of the southern hardwood chips was allowed before the pretreatment temperature was raised to its maximum of 335° F. Following the chemical pretreatment, the hardwood materials were refined in an eight-inch laboratory disc refiner and thoroughly washed. The materials were then pulped and bleached to 80 G.E. brightness (TAPPI Standard T 217m–48) by the preferred five-stage chlorine dioxide-caustic extraction sequence, using the total amounts of chlorine dioxide corresponding to the level of pretreatment yield involved and shown in Example IX. The pretreatment yield range covered was 61 percent to 86 percent.

The yield data, strength data of standard laboratory handsheets, and some data on the degree of polymerization (D.P.) of the final bleached pulp is summarized in the following table.

| Neutral sulfite pretreatment yield, percent of wood | Final yield, percent of wood | DP [1] | At 600/300 degrees Canadian Standard Freeness | | |
|---|---|---|---|---|---|
| | | | Percent tensile [2] | Percent burst [3] | Percent tear [4] |
| 61 | 53 | 1,680 | 46/78 | 78/150 | -/160 |
| 62 | 53 | | 50/83 | 98/152 | -/165 |
| 73 | 54 | | 56/78 | 100/152 | -/174 |
| 70 | 57 | 2,000 | 61/85 | 105/160 | -/173 |
| 81 | 57 | | 70/89 | 115/159 | -/175 |
| 6 | 65 | 2,100 | 55/90 | 96/178 | -/176 |

[1] DP (polymerization) estimated from Cuene viscosity measurement performed according to TAPPI Standard T 230 su–66 (pipet method).
[2] Lbs. to rupture 1 inch wide strip / Lbs. per 3,000 sq. ft.
[3] P.s.i. to rupture 1.2 inch disc / Lbs. per 3,000 sq. ft.
[4] Grams of force to tear 137.6 cm. / Lbs. per 3,000 sq. ft.

It is evident from these data that there is a trend toward increasing (all) strength properties as pretreatment yield is increased. Also, it is evident that this increase generally is most pronounced over the yield range of 61 to 70 percent, and then a reasonably constant, high strength level is maintained with further yield increases.

This same trend is borne out by the degree of polymerization (DP) data. As bleached yield decreases (other things remaining constant), a pulp contains less low-DP hemicellulose and (proportionately) more high-DP cellulose. Therefore, if there were no undesirable chemical degradation occurring, a steady increase in DP would be expected as pretreatment yield decreases. Actually, just the opposite occurs, showing that the chemical pretreatment (particularly in the pretreatment yield range below 70%) is having a chemically degrading effect on the retained pulp carbohydrates.

From both the test results and the measurements of

The critical experimental conditions, together with the indicated results, are shown below. Runs 1 and 2, at equal pretreatment yield, show the effect of variations in applied chemicals.

| Run | Pretreatment impreg. time before max. temp., min. | Max. pretreatment temp., °F. | Pretreatment liquor | | | Pretreatment yield | Percent chlorine dioxide required wood basis | Std. percent chlorine dioxide required [1] | Handsheet properties at 600° CSF/ 300° CSF [5] | | |
|---|---|---|---|---|---|---|---|---|---|---|---|
| | | | Percent sodium sulfite wood basis | Percent sodium carbonate wood basis | Sodium sulfite/ sodium carbonate ratio | | | | Tensile,[2] percent | Burst,[3] percent | Tear,[4] percent |
| 1 | 120 | 335 | 24 | 5 | 4.8 | 74 | 6.0 | 6.2 | 56/76 | 89/133 | 175/136 |
| 2 | 120 | 335 | 12 | 10 | 1.2 | 73 | 6.3 | 6.0 | 55/82 | 93/165 | 208/152 |
| 3 | 120 | 335 | 12 | 10 | 1.2 | 86 | 8.0 | 8.5 | 55/90 | 96/178 | 208/176 |
| 4 | 120 | 335 | 9 | 9 | 1.0 | 84 | 10.1 | 8.1 | 49/71 | 78/132 | 156/128 |
| 5 | 30 | 345 | 14.2 | 5.2 | 2.7 | 85 | 8.3 | 8.3 | 35/74 | 62/135 | 210/175 |

Figure 8:
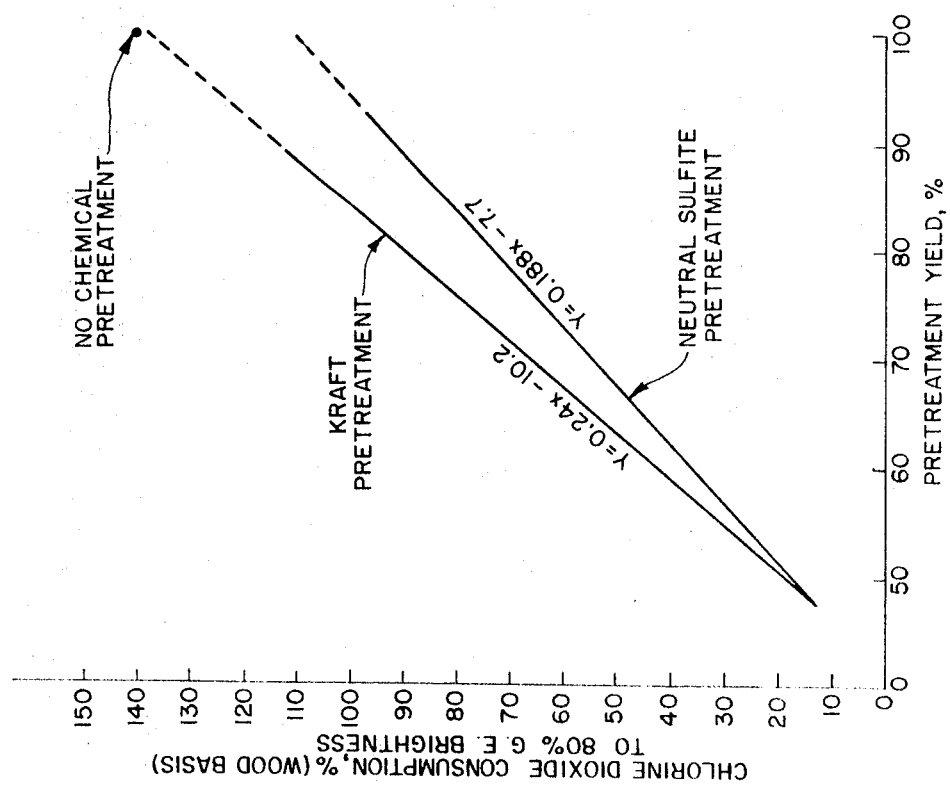

[1] Values taken from the chlorine dioxide consumption-pretreatment yield curve, Example IX, Fig. 8.
[2] TAPPI Standard T404 ts-66.
[3] TAPPI Standard T403 ts-63.
[4] TAPPI Standard T414 ts-65.
[5] Canadian Standard Freeness, TAPPI Standard T227 m-58.

pulp DP or molecular length, it is apparent that maximum pulp strengths are favored at higher chemical pretreatment yields. Further, this effect is most pronounced at the low end of the pretreatment yield scale, and suggests that the preferred conditions would involve pretreatment yields above approximately 64 percent.

An upper limit on pretreatment yield is fixed by considering the pretreatment yield-final bleached yield-chlorine dioxide consumption relationships. FIG. 8 shows the pretreatment yield-chlorine dioxide consumption relationship for neutral sulfite pretreatment, with the no-chemical pretreatment point corresponding to 100 percent pretreatment yield. In reality, the neutral sulfite line is followed until a pretreatment yield of 95 percent is approached; at this point the consumption rises rapidly from this line and passes through the no-chemical pretreatment point. Thus, at pretreatment yields above 95 percent, a disproportionately large amount of chlorine dioxide is consumed. This is, of course, very undesirable.

Figure 7:
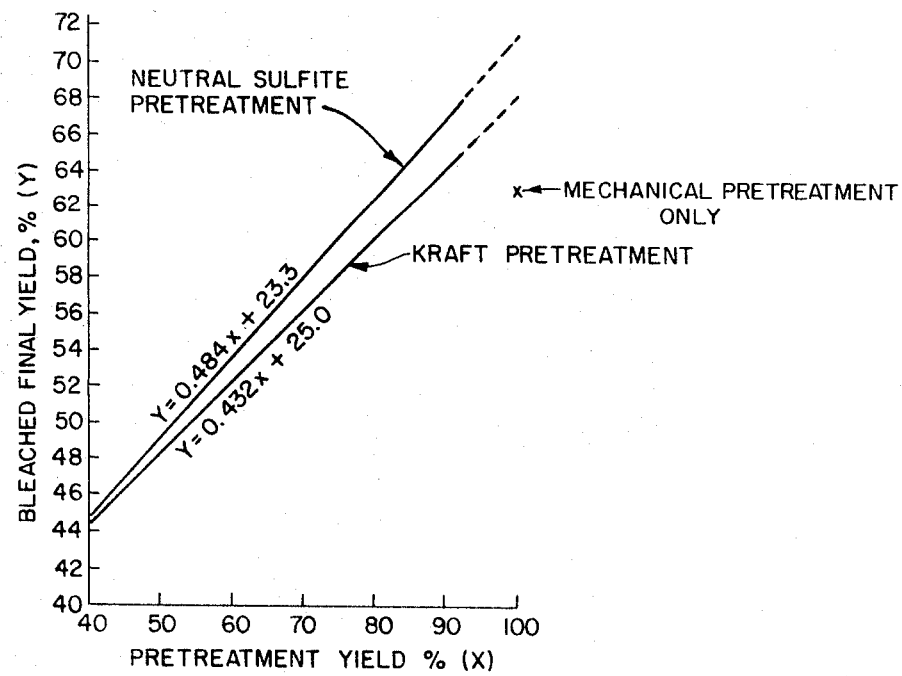

FIG. 7 shows a parallel behavior for bleached yields. At pretreatment yields above about 95 percent, the bleached yield actually decreases to the point corresponding to mechanical pretreatment only. Since maximum yield is desirable, this decrease is undesirable.

Further reason for maintaining pretreatment yield below 95 percent is found in Example IX, in which it is shown that 100 percent pretreatment yield produces inferior paper strength properties as compared with papers in the below 95 percent pretreatment yield range.

EXAMPLE VI

To demonstrate the preferred conditions for the sodium base neutral sulfite pretreatment, it is shown below that proper pretreatment liquor impregnation of the chips prior to heating is necessary to maximize handsheet strength and minimize fiber bundle or shive content. It is also shown that proper ratio of pretreatment chemicals is necessary to provide maximum strength and ease of pulping and bleaching with the subsequent chlorine dioxide-caustic sequence.

Runs were made using two extremes of liquor impregnation prior to chemical pretreatment, and with a range of ratios of sodium sulfite to sodium carbonate in the pretreatment liquor. In all cases sufficient pretreatment chemical was applied so that the final liquor pH was above 7. If allowed to drop below this value, a weak pulp resulted. The raw material was a southern hardwood chip mixture. Following chemical pretreatment, the materials produced were refined under constant conditions in a laboratory eight-inch disc refiner, thoroughly water washed, and subjected to the five-stage chlorine dioxide-caustic sequence for pulping and bleaching to 80 G.E. brightness (TAPPI Standard T 217m–48). The total chlorine dioxide required to achieve this brightness was determined together with standard handsheet physical tests on the bleached pulp.

While pulping chemical (chlorine dioxide) consumption is constant, a significant increase in pulp handsheet strengths results when the sulfite/carbonate ratio is reduced from about five to slightly more than one.

Runs 3 and 4 show the effect of still further reduction in this base ratio from 1.2 to 1.0. A very significant decrease in pulp handsheet strentghs results, along with a large increase (about 25 percent based on the normal chemical application) in chlorine dioxide consumption. Thus, while optimum conditions exist at a sulfite/carbonate ratio of slightly above unit, it is critical that this ratio not be allowed to drop below about 1.2 because of detrimental effects on both pulp physical properties and pulping chemical consumption.

Runs 1, 3 and 5 show the importance of adequate pretreatment liquor impregnation of the chipped raw material. Since the chemical ratio of Run 5 is intermediate between those of Runs 1 and 3, the observed marked decrease in handsheet physical properties is attributable to the lack of adequate chip impregnation. Optimum impregnation conditions depend upon the type (wood species) and chip dimensions of the raw material. Sufficient pretreatment chemical must be added to maintain the pH at 7 or above during the pretreatment.

The ratio of sodium sulfite to sodium carbonate applied should be held in the vicinity of about 1.5 for highest pulp strength. Higher values result in reduced strengths; values below about 1.2 give weaker pulps and increased pulping chemical (chlorine dioxide) consumption.

Adequate pretreatment liquor penetration into the raw material must be achieved, or strength properties suffer and shive content increases. Optimum conditions depend upon raw material structure and particle dimensions.

EXAMPLE VII

To demonstrate the extent to which chlorine can be substituted for chlorine dioxide in the present pulping-bleaching sequence, and because of potential economics, the desirability of substituting other selective delignifying agents for at least a portion of this chlorine dioxide was investigated.

In general, with equivalent additions of bleaching chemicals, a higher bleached brightness is obtained uisng mixtures than with either chlorine or chlorine dioxide alone when bleaching kraft pulps. However, since the starting material with a bleachable kraft pulp is much different from the neutral sulfite-pretreated material presently under consideration, and since the desired action with chlorine and chlorine dioxide additions to conventional kraft pulp is largely one of bleaching (initial pulp lignin contents of perhaps two percent), while the chlorine dioxide in the present case is used to remove a large quantity of chemically different lignin (pretreated pulp lignin content approximately fifteen percent) as well as to bleach, prior art results are not directly translatable to the present invention.

Since some systems for chlorine dioxide generation result in the simultaneous generation of chlorine, and since efficient use of this chlorine is essential to sound chlorine dioxide generation economics, runs were made to determine the feasibility of substituting chlorine for chlorine dioxide at various points in the pulping sequence. Sodium base neutral sulfite pretreated southern hardwood chips were mechanically refined in a laboratory disc refiner and thoroughly water washed prior to the pulping-bleaching sequence. In one run all chlorine was substituted for the normally used chlorine dioxide. The chemical application and results in terms of pulp pentosan content, brightness, screen rejects (amount retained on a laboratory vibratory flat screen using a 0.008-inch cut screen) and handsheet brightness are summarized below:

| Case | Neutral sulfite pretreatment yield, percent | Pulping sequence used [1] | Pulping chemical applied, percent (wood basis) equivalent chlorine dioxide | Final pulp G.E. brightness [2] | Final pulp pentosans,[3] percent | Final pulp viscosity,[4] DP | Screening rejects, percent |
|---|---|---|---|---|---|---|---|
| 1 | 88 | DEDED | 8.8 | 86 | 19.8 | 2,310 | 0.4 |
| 2 | 88 | CECEC | 8.8 | 69 | 8.1 | 1,290 | 25 |

[1] D=chlorine dioxide, C=chlorine, E=caustic extraction.
[2] TAPPI Standard T217 m-48.
[3] Measure of amount of hemicellulose, TAPPI Standard T19 m-50.
[4] TAPPI Standard T230 su-66; DP is degree of polymerization.

It is apparent from the extremely low brightness, low pentosan content, low DP, and high screen rejects that chlorine cannot be substituted for all chlorine dioxide.

Next a series of runs was conducted in which all and half of the chlorine dioxide normally applied in the first stage (equivalent oxidizing basis) was substituted by chlorine. The raw material again was a neutral sulfite pretreated southern hardwood chip mixture, mechanically refined in an eight-inch laboratory disc refiner; the pretreatment yield was 85 percent. The conditions employed, together with the brightness and strength results of handsheets prepared from the final pulps, are shown below:

|  | First stage all chlorine dioxide | First stage ½ chlorine plus ½ chlorine dioxide | First stage all chlorine |
|---|---|---|---|
| Percent chlorine dioxide in 1st stage (wood basis) | 4.7 | 2.35 | 0 |
| Percent chlorine in 1st stage (wood basis) | 0 | 6.15 | 12.3 |
| Percent sodium hydroxide in each of the 1st and 2d extraction stages | 8 | 8 | 8 |
| Percent chlorine dioxide in 2d chlorine dioxide stage (wood basis) | 2.4 | 2.4 | 2.4 |
| Percent dioxide in 3d chlorine dioxide stage (wood basis) | 1.2 | 1.2 | 1.2 |
| G.E. bleached brightness [1] | 80.5 | 78.5 | 66.2 |
| Shives | No | No | Yes |
| Percent tensile strength [2]: |  |  |  |
| 600° C.S.F. [4] | 59 | 59 | 43 |
| 300° C.S.F. | 85 | 78 | 69 |
| Percent bursting strength [3]: |  |  |  |
| 600° C.S.F. | 102 | 102 | 58 |
| 300° C.S.F. | 48 | 48 | 128 |

[1] TAPPI Standard T217 m-48.
[2] TAPPI Standard T404 ts-66.
[3] TAPPI Standard T403 ts-63.
[4] TAPPI Standard T227 m-58.

From the above results it was concluded that there is no synergistic effect of chlorine-chlorine dioxide mixtures, as has been reported in the art for such mixtures when bleaching kraft pulps; brightness is somewhat lowered by 50 percent chlorine substitution (oxidizing equivalent basis), and is very significantly harmed by use of all chlorine in the first stage of the pulping sequence; substitution of all chlorine in the first stage results in unbleached, undefibered shives or fiber bundles; and strength properties are not greatly affected by the half-substitution case, but are very significantly reduced when all chlorine is used in the first stage.

While the use of chlorine in any proportion in the present invention offers no advantages in terms of pulp quality, certain amounts of chlorine can be used in the initial chlorine dioxide stage without adverse effects. The upper limit to chlorine substitution is about 25 to 30 percent of the total chlorine dioxide requirement on an equivalent oxidant basis; this maximum corresponds to a weight proportion of about 50 percent chlorine and 50 percent chlorine dioxide.

EXAMPLE VIII

To demonstrate the advantages of using sodium base neutral sulfite (sodium sulfite and sodium carbonate) chemical pretreatment in preference to either nitric acid or ammonia base neutral sulfite, these three pretreatment combinations were evaluated.

The three chemical-mechanical pretreatments were achieved using the chemical conditions shown below using mixed southern hardwood chips as raw material. In all cases, the chemical pretreatment was followed by refining in a laboratory eight-inch disc refiner, thorough washing, and pulping and bleaching using the chlorine dioxide-caustic-chlorine dioxide-caustic-chlorine dioxide treatment sequence. Conditions and results are in the table below.

It is apparent that nitric acid pretreatment results in both lower bleached yield and lower handsheet strength, indicating excessive carbohydrate degradation during this pretreatment. Sodium base neutral sulfite produces a stronger pulp than ammonia base pretreatment. Also, with the ammonia base pretreatment it is more difficult to delignify and bleach, and the pulp contains somewhat more shives and fiber bundles.

From this comparison, it is apparent that either of the neutral sulfite bases gives a better pretreatment than does nitric acid. Also, sodium base is superior to ammonia base neutral sulfite, other factors not considered. The ammonia base does give a very acceptable, high yield bleached pulp, and where factors such as pollution considerations are controlling, the ammonia base is exceptionally attractive.

| Pretreatment Chemical[1] | Sulfite, percent equivalent sodium sulfite (on wood) | Carbonate, percent equivalent sodium carbonate (on wood) | Percent nitric acid (on wood) | Pretreatment yield, percent | Percent chlorine (wood basis) | Bleached yield, percent | G.E. brightness[2] | At 300° Canadian Standard Freeness[6] Tensile,[3] percent | Burst,[4] percent | Tear,[5] percent |
|---|---|---|---|---|---|---|---|---|---|---|
| Sodium base neutral sulfite | 12 | 10 |  | 73 | 6.0 | 58 | 80 | 82 | 152 | 165 |
| Ammonia base neutral sulfite | 13.2 | 11.1 |  | 72 | 6.0 | 58 | 80 | 73 | 143 | 148 |
| Nitric acid |  |  | 25 | 73 | 6.1 | 54 | 80 | 70 | 121 | 112 |

[1] The neutral sulfite pretreatment cycle for both sodium and ammonia base involved 30 min. to and 60 min. at 273° F. plus 30 min. to and 120 min. at 355° F.
[2] TAPPI Standard T217 m-48.
[3] TAPPI Standard T404 ts-66.
[4] TAPPI Standard T403 ts-63.
[5] TAPPI Standard T414 ts-65.
[6] TAPPI Standard T227 m-58.

EXAMPLE IX

To demonstrate the advantages of using a neutral sulfite pretreatment in preference to a high-yield kraft pretreatment or an entirely mechanical pretreatment, the following runs were made.

The raw material was a mixture of southern hardwood chips (approximately one-third oak, one-third yellow poplar, and one-third gum). In the case of the chemical pretreatments (kraft and neutral sulfite), sufficient time for liquor impregnation was allowed prior to heating to maximum temperature. The chemically pretreated material (and the hardwood chips following presteaming in the case of mechanical pretreatment only) was then refined in an eight-inch laboratory disc refiner to give a starting material for the chlorine dioxide pulping/bleaching sequence. Pretreatment was analyzed through the following:

$S$ = Selectivity of chemical pretreatment $$= \frac{\text{Mass of lignin removed}}{\text{Mass of original wood removed}}$$

Selectivity of various chemical pretreatment yields was determined as follows:

| Pretreatment | Pretreatment yield | S (pretreatment only) |
|---|---|---|
| Sodium base neutral sulfite | 60 | 0.38 |
| | 70 | 0.43 |
| | 80 | 0.47 |
| | 90 | 0.52 |
| Kraft | 60 | 0.39 |
| | 70 | 0.32 |
| | 80 | 0.24 |

The above table shows that, for a high-yield pulping process, the neutral sulfite pretreatment offers the greatest selectivity and therefore the greatest potential for final bleached or semibleached pulp yield. As the pretreatment yield approaches that normally achieved during the pulping portion of a pulp-bleach sequence, the selectivities approach each other.

By pulping and bleaching this pretreated material to 80 G.E. brightness (TAPPI Standard T217m–48) using the chlorine dioxide-caustic-chlorine dioxide-caustic-chlorine dioxide treatment sequence, the selectivities shown below are obtained:

| Pretreatment | Final bleached yield, percent | Overall selectivity, S |
|---|---|---|
| Sodium base neutral sulfite | 50 | 0.46 |
| | 55 | 0.53 |
| | 60 | 0.61 |
| | 65 | 0.69 |
| Kraft | 50 | 0.53 |
| | 55 | 0.54 |
| | 60 | 0.56 |
| | 65 | 0.58 |
| Mechanical only | 63 | 0.64 |

Again, it is apparent that at the higher bleached yields (above 55 percent), the neutral sulfite pretreatment is more selective than kraft.

Since the chlorine dioxide pulping sequence itself is quite selective, use of a mechanical pretreatment only, followed by the chlorine dioxide sequence, might be expected to give a very high selectivity value. However, the data show that a high-yield neutral sulfite pretreatment followed by the chlorine dioxide sequence is more selective than the no-pretreatment case.

These results are shown graphically in FIG. 7. For any given pretreatment yield, the neutral sulfite pretreatment gives a significantly higher final bleached yield, indicating its increased selectivity. The mechanically pretreated case (shown at 100 percent pretreatment yield) lies far below the extrapolated chemical pretreatment cases, indicating the relatively low degree of selectivity achieved.

The relatively lower selectivity of kraft pretreatment suggests more lignin remaining at any given pretreatment yield, and therefore a higher pulping chemical (chlorine dioxide) requirement. The table below shows this to be true. Thus, neutral sulfite pretreatment gives a higher bleached yield and lower chlorine dioxide consumption than does kraft pretreatment; chlorine dioxide savings up to 24 percent are possible at higher pretreatment yields.

| Pretreatment | Pretreatment yield, percent | Chlorine dioxide consumption (percent of wood) | Chlorine dioxide savings [1] |
|---|---|---|---|
| Kraft | 50 | 1.8 | 6 |
| Neutral sulfite | 50 | 1.7 | |
| Kraft | 60 | 4.2 | 17 |
| Neutral sulfite | 60 | 3.6 | |
| Kraft | 70 | 6.6 | 20 |
| Neutral sulfite | 70 | 5.5 | |
| Kraft | 80 | 9.0 | 23 |
| Neutral sulfite | 80 | 7.3 | |
| Kraft | 90 | 11.4 | 24 |
| Neutral sulfite | 90 | 9.2 | |
| Mechanical only | 100 | 14.0 | |

[1] Neutral sulfite vs. kraft (percent of neutral sulfite-chlorine dioxide requirement).

These results, as well as the relatively high consumption of chlorine dioxide by the mechanical pretreatment case, are also shown graphically by FIG. 8 of the drawings.

From these comparisons, it is clear that the sodium base neutral sulfite pretreatment gives higher bleached yield and lower pulping chemical (chlorine dioxide) cost than does kraft. Also, pure mechanical pretreatment yields higher chlorine dioxide consumption and lower yield than extrapolated neutral sulfite data. From yield and chemical economy standpoints, neutral sulfite is preferred over these two alternates.

For consideration of the resultant pulp properties, as measured by physical properties of standard handsheets, the table below shows the standard strength properties for neutral sulfite, kraft and mechanically pretreated cases, each pulping and bleaching using the chlorine dioxide-extraction five-stage sequence:

| Pretreatment | Pretreatment yield, percent of wood [1] | Values at 600/300 Canadian Standard Freeness [5] | | |
|---|---|---|---|---|
| | | Tensile, percent [2] | Burst, percent [3] | Tear, percent [4] |
| Sodium base neutral sulfite | 85 | 54/91 | 96/179 | 207/180 |
| Kraft | 85 | 43/81 | 83/180 | 180/165 |
| Mechanical only | 100 | 55/72 | 90/133 | 165/134 |

[1] Southern hardwood chips.
[2] TAPPI Standard T404 ts-66.
[3] TAPPI Standard T403 ts-63.
[4] TAPPI Standard T414 ts-65.
[5] TAPPI Standard T227 m-58.

It is apparent that the kraft pretreatment results in lower tensile and tear than neutral sulfite pretreatment, and that the mechanical pretreatment is also inferior in strength.

Overall, it can be concluded that the sodium base neutral sulfite pretreatment is preferred over either high-yield kraft or mechanical pretreatment, since it results in higher final bleached yield, lower chlorine dioxide consumption, and higher pulp handsheet strengths.

EXAMPLE X

To demonstrate the uniqueness of the sodium base neutral sulfite pretreatment-chlorine dioxide pulping sequence compared to conventional bleaching of neutral sulfite pulps, the strength properties of paper prepared from southern hardwood chips via the process of the present invention were compared with the properties of a bleached pulp prepared by a conventional neutral sulfite pulping step followed by a conventional bleaching sequence of chlorination-caustic extraction-hypochlorite bleaching, the latter case being typical of present state of the art bleached neutral sulfite pulps. The differences obtained were as follows:

|  | Conventional bleached hardwood neutral sulfite | Neutral sulfite pretreatment-chlorine dioxide pulping case | Percent improvement [1] |
|---|---|---|---|
| Neutral sulfite (pretreatment yield, percent of wood) | ~60 | 80 |  |
| Final bleached yield, percent of wood | 52 | 62 | 19 |
| At 300 Canadian Standard Freeness [6]: |  |  |  |
| Tensile strength, kilometers [2] | 7.2 | 9.1 | 38 |
| Burst, percent [3] | 98 | 137 | 40 |
| Tear, percent [4] | 110 | 125 | 14 |
| M.I.T. fold [5] | 120 | 880 | 630 |

[1] Improvement calculated relative to the conventional case.
[2] TAPPI Standard T404 ts-66.
[3] TAPPI Standard T403 ts-63.
[4] TAPPI Standard T414 ts-65.
[5] TAPPI Standard T511.
[6] TAPPI Standard T227 m-58.

From these comparisons, it is very apparent that the present invention produces a pulp of much higher yield, while at the same time giving paper of much higher physical strengths. The difference in folding endurance is particularly noteworthy, since this is the most important paper physical property of most book and publication papers.

EXAMPLE XI

To demonstrate the superiority of the sodium base neutral sulfite-chlorine dioxide sequence relative to conventionally bleached kraft pulps, the below tests were conducted. Previous examples have demonstrated the superiority of the product of the sodium base neutral sulfite-chlorine dioxide process relative to conventionally bleached neutral sulfite as well as relative to pretreatment-chlorine dioxide sequence pulps in which the pretreatment is any of the following: mechanical, ammonia-base neutral sulfite, high-yield kraft, and nitric acid.

Using a constant raw material source of mixed southern hardwood chips, pulp samples were prepared using two processes: the sodium base neutral sulfite pretreatment-chlorine dioxide pulping sequence of the present invention and a conventionally pulped and bleached kraft pulp. These pulps were refined to 300 degrees Canadian Standard Freeness (TAPPI Standard T227 m-58) and formed into paper on a small twelve-inch paper machine, so that the results would be more indicative of the properties of machine-made papers. The physical and surface smoothness properties of these two papers are compared in the following tables:

| Physical property tested | Conventional bleached kraft pulp | Neutral sulfite-chlorine dioxide pulp |
|---|---|---|
| Burst, percent [1] | 43.8 | 91.6 |
| Tear, percent [2] MD/CD [3] | 86/104 | 124/197 |
| Tensile, percent [4] MD/CD | 33/14 | 93/35 |
| Stretch, percent [5] MD/CD | 1.5/2.6 | 2.1/3.4 |
| Tensile energy absorption, [6] MD/CD | 1.65/1.52 | 4.73/3.58 |
| Fold (M.I.T.), [7] MD/CD | 27/6 | 1,019/92 |
| Wax pick, felt/wire [8] | 6/2 | 13/6 |

[1] TAPPI Standard T403 ts-63.
[2] TAPPI Standard T414 ts-65.
[3] MD and CD refer to machine direction and cross-machine direction sheet properties.
[4] TAPPI Standard T404 ts-66.
[5] TAPPI Standard T457 m-46.
[6] TAPPI Standard T494 su-64.
[7] TAPPI Standard T-511.
[8] TAPPI Standard T-459 su-65.

| Pulp [1] | Gurley [2] porosity | Bekk [3] smoothness | Sheffield [4] smoothness |
|---|---|---|---|
| Conv. bleached kraft pulp | 5 | 17 | 276 |
| Neutral sulfite-chlorine dioxide pulp | 15 | 50 | 194 |

[1] Both pulps from the same hardwood mixture.
[2] Gurley porosity is the time interval required to pass a constant volume of air through the sheet, thus high values indicate low porosity.
[3] Bekk smoothness is the time required to leak a constant volume of air between the sheet and a polished glass surface, thus higher values indicate greater sheet smoothness.
[4] Sheffield smoothness is the rate at which air leaks between two rings which are in contact with the sheet. Thus, high values indicate low smoothness.

It is apparent that the paper made from the neutral sulfite-chlorine dioxide process is greatly superior in the physical properties of burst, tear, tensile, stretch, and M.I.T. fold. The wax pick test shows the new pulp to be very superior in internal bond strength, a property of great importance for papers which are to be printed. The smoothness measurements show the new pulp to be of greater smoothness, which is advantageous for printing papers and various other applications.

The superiority of the new pulp in terms of both handsheet tensile and tear suggests that the new process gives a pulp of very superior fiber strength; if bonding alone were involved, a high tensile would result in a low tear and vice versa. To confirm the superiority of fiber strength, zero-span tensile tests were run on handsheets prepared from the two pulps. These results are shown below:

Pulp: Zero-span value, percent [1]
    Conventional bleached kraft _____ 89
    Neutral sulfite-chlorine dioxide _____ 150

[1] TAPPI Standard T231 sm-60. Values expressed as percent calculated as:

$$\text{Percent zero-span} = \frac{\text{zero-span strength, lb./in.}}{\text{sheet basis weight, lb./3000 ft.}^2}$$

Since this test, run on standard sheets of constant basis weight, gives a direct means of comparing fiber strengths, it is concluded that a very unique fiber, having a strength per unit fiber mass of over sixty percent greater than that of a conventionally prepared fiber, is produced by the pulping process of the present invention.

EXAMPLE XII

To demonstrate that, in addition to the superior properties of the pulp of the present invention when made into laboratory handsheets or paper on a paper machine, the pulp exhibits certain unique properties related to its processing before and during the papermaking operation, such as great ease of refining, increased ease of drainage during paper formation, ability to retain fillers more efficiently, superior wet web strength on the paper machine, and increased ease of paper machine drying, the following comparisons were made.

Figure 9:
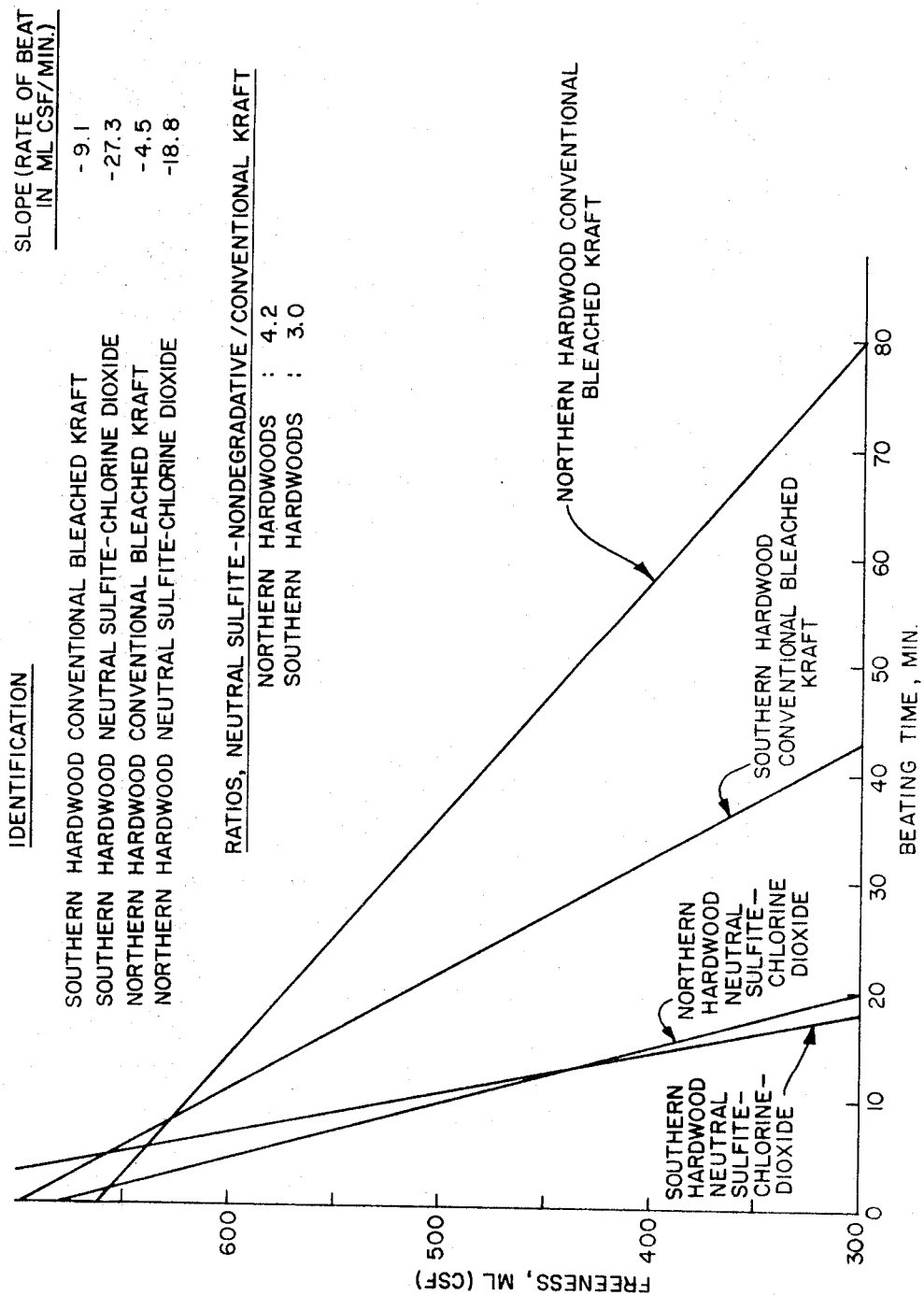

The ease of refining is shown by the data in the table below, as well as in FIG. 9. A comparison is made of the response of pulps to refining in a standard TAPPI beating test. Neutral sulfite-chlorine dioxide pulps are compared to conventional bleached kraft, in one case with the pulps prepared from a southern hardwood chip mixture and in the second case using northern hardwood chips. The slopes of the curves in FIG. 9 indicate that the relative beating rate, new pulp versus kraft, is 3.0 for pulps from the southern woods and 4.2 for pulps from the northern woods. Since the time required to beat a pulp under these standard conditions is directly proportional to the energy required to refine to any given degree, it is apparent that refining energy requirement for the new pulp is only ⅓ to ¼ that required with kraft.

| Wood | Process | Beating time, min.[1] | Freeness, ml. (C.S.F.)[2] |
|---|---|---|---|
| Southern hardwoods. | Conventionally bleached kraft. | 0 | 650 |
| Do | Neutral sulfite-chlorine dioxide sequence. | 0 | 740 |
| Do | Conventionally bleached kraft. | 14 | 600 |
| Do | Neutral sulfite-chlorine dioxide sequence. | 8 | 600 |
| Do | Conventionally bleached kraft. | 25 | 500 |
| Do | Neutral sulfite-chlorine dioxide sequence. | 11 | 500 |
| Do | Conventionally bleached kraft. | 34 | 400 |
| Do | Neutral sulfite-chlorine dioxide sequence. | 14 | 400 |
| Do | Conventionally bleached kraft. | 41 | 300 |
| Do | Neutral sulfite-chlorine dioxide sequence. | 15 | 300 |
| Northern hardwoods. | Conventionally bleached kraft. | 0 | 600 |
| Do | Neutral sulfite-chlorine dioxide sequence. | 0 | 660 |
| Do | Conventionally bleached kraft. | 0 | 600 |
| Do | Neutral sulfite-chlorine dioxide sequence. | 5 | 600 |
| Do | Conventionally bleached kraft. | 36 | 500 |
| Do | Neutral sulfite-chlorine dioxide sequence. | 10 | 500 |
| Do | Conventionally bleached kraft. | 59 | 400 |
| Do | Neutral sulfite-chlorine dioxide sequence. | 14 | 400 |
| Do | Conventionally bleached kraft. | 80 | 300 |
| Do | Neutral sulfite-chlorine dioxide sequence. | 18 | 300 |

[1] Beaten in Vally Beater according to TAPPI Standard T200 ts-66.
[2] TAPPI Standard T 227 m-58.

When making small scale paper machine trials, it was observed that, at a constant freeness of 300 degrees Canadian Standard, only one-half as much vacuum applied to the drainage area of the paper machine wire was required to drain the free water from the neutral sulfite-chlorine dioxide pulp as was required with the corresponding bleached kraft pulp (when in both cases the drainage was forced to occur over a constant distance on the paper machine wire). This illustrates the potential for increased machine speeds with the new pulp.

During these same paper machine trials, filler wa added to the fiber furnish and the retention of this filler during the sheet forming process was measured. These results, shown below, illustrate the very marked superior retention exhibited by the new pulp compared to conventional bleached kraft. Actually, the effect is even more dramatic than the percent retention numbers indicate, since fifty percent more filler was added in the case of the new pulp. It is well known that percent retention decreases as the applied amount of filler increases, other factors remaining constant.

| Pulp | Filler, percent applied (pulp basis) | | | Percent of the filler applied which was retained | | |
|---|---|---|---|---|---|---|
| | Clay | Titanium dioxide | Total | Clay | Titanium dioxide | Total |
| Conventional bleached kraft | 32 | 8.0 | 40 | 8.7 | 9.6 | 8.8 |
| Neutral sulfite-chlorine dioxide | 48 | 12 | 60 | 19 | 28 | 21 |

When the wet sheet is lifted from the paper machine wire and passes to the first press, there is a danger of the sheet rupturing while in a wet, tender condition. This tendency for breaks is controlled by the wet web strength of the sheet. On the small paper machine trials, with the machine running under identical conditions, it was observed that the kraft sheet was very prone to frequent breaks, while the new pulp sheet ran trouble free. While these results are not quantitive, they do show the superior wet web strength possessed by this new pulp.

During these same paper machine trials, and with the machine operating at a constant speed, it was observed that only one-half as great a temperature differential was required in the drier section to dry the new pulp sheet as was required with conventional kraft. In other words, the new pulp sheet possessed double the drying rate of the conventional kraft.

The ease of refining, coupled with more rapid drainage, higher wet web strength and ease of drying, all indicate the ability to increase paper production relative to that obtainable with conventional pulp. The greatly increased filler retention characteristics also leads to significantly improved economics, especially in the case of highly filled sheets.

EXAMPLE XIII

To demonstrate the chemical uniqueness of the pulp, comparisons of the degree of polymerization and hemicellulose content of various pulps from the same wood mixture were made as follows:

| Pulping process | Final bleached yield, percent | Hemicellulose, percent (wood basis) | Degree of polymerization |
|---|---|---|---|
| Conventional kraft-conventional bleach | 42.3 | 7.1 | 650 |
| Neutral sulfite-chlorine dioxide sequence | 53.0 | 9.6 | 1,770 |
| Do | 57.3 | 10.7 | 2,000 |
| Do | .3 | 12.9 | 2,100 |

The carboxyl content of the neutral sulfite-chlorine dioxide sequence pulp is at least twice as great as the carboxyl content of conventionally bleached pulps. At the same time, the carbonyl content is only ½ to ⅓ as great as the carbonyl content of conventionally bleached pulp from the same wood. The neutral sulfite pretreatment portion of the sequence is necessary to keep the carbonyl content low, as is seen by comparison of the data for pulps with and without the neutral sulfite pretreatment.

| Pulping process | Carbonyl number [1] | Carboxyl number [2] |
|---|---|---|
| Conventional bleached kraft | 0.67 | 4.9 |
| Mechanical pretreatment-chlorine dioxide sequence | 1.2 | 18.8 |
| Neutral sulfite-chlorine dioxide sequence | 0.24 | 14.2 |

EXAMPLE XIV

To demonstrate the effort of pulp chemical properties on brightness stabiilty and ion exchange capacity, two chlorine dioxide-sequence pulps are compared to conventional bleached kraft in the table below. In all cases the raw material was a mixture of southern hardwoods. It is apparent that the pulps rank: neutral sulfite >mechanical pretreatment>chlorine dioxide>conventional kraft in terms of brightness stability with kraft being poorest even though it is of intermediate carbonyl content (high percent reversion or high post color number indicates low brightness stability).

| Pulp Identification | Original[1] brightness | Aged[2] brightness | Reversion,[3] percent | Post color number[4] |
|---|---|---|---|---|
| Conventionally bleached kraft | 79.8 | 74.9 | 6.1 | 1.6 |
| Mechanical pretreatment-chlorine dioxide sequence | 80.8 | 77.4 | 4.2 | 2.7 |
| Neutral sulfite-chlorine dioxide sequence | 80.5 | 78.6 | 2.4 | 0.55 |

[1] Brightness before aging, percent General Electric, TAPPI Standard T217 m-48.
[2] Brightness after aging for 4 hours at 105°.
[3] Reversion, percent defined as:

$$100 \times \left( \frac{\text{Brightness before} - \text{brightness after}}{\text{Brightness before}} \right)$$

[4] Post color number, defined as:

$$100 \times \left\{ \left( \frac{100 - \text{percent brightness after aging}}{2 \times (\text{percent brightness after aging})} \right) - \left( \frac{100 - \text{percent brightness before aging}}{2 \times (\text{percent brightness before aging})} \right) \right\}$$

The carboxyl content of the chlorine dioxide sequence pulp is so high that it can behave as an ion exchange material. If this pulp is treated with a salt solution, the resulting pulp will retain the metal atoms. This results in higher ash content and many unique chemical properties. Brightness and opacity as well as brightness stability are strongly affected by the nature of the cation bound to the pulp. The table below shows the effects of trace amounts of zinc, sodium, aluminum, and potassium ions on pulp optical properties. It is apparent that significant changes result, which do not occur when conventional kraft pulp is subjected to similar treatments.

| Pulp | Cation[1] | Percent change in brightness[2] | Percent change in opacity[3] |
|---|---|---|---|
| Kraft conventional bleach | Zinc | +1 | +3 |
| Neutral sulfite-chlorine dioxide | do | +2 | +14 |
| Kraft conventional bleach | Sodium | −1 | 0 |
| Neutral sulfite-chlorine dioxide | do | +3 | +14 |
| Kraft conventional bleach | Aluminum | 0 | 0 |
| Neutral sulfite-chlorine dioxide | do | +4.0 | +20 |
| Kraft conventional bleach | Potassium | +1 | 0 |
| Neutral sulfite-chlorine dioxide | do | +5 | +9 |

[1] These cations were removed from dilute salt solutions by the ion exchange phenomena of the pulp.
[2] TAPPI Standard T217 m-48.
[3] TAPPI Standard T425 m-60.

EXAMPLE XV

To demonstrate the durability of the neutral sulfite-chlorine dioxide pulp, fold tests were run on four cation treated neutral sulfite-chlorine dioxide pulps after zero, one, two, three, and seven days of aging at 105° C. The results were compared to typical book paper and to a special alkaline treated softwood paper.

It was found that hand sheets made of the neutral sulfite-chlorine dioxide pulp that had been treated with either sodium, lead, or no cations were very durable. Handsheets made from pulp of the present invention treated with alum were less durable although they were more durable that typical rosin alum sized book paper.

The pulp used was produced from a southern hardwood species mixture. The wood mixture was given a neutral sulfite cook, and refined in a high pressure refiner for a 85.5 percent yield. The pulp was then washed and bleached by a five-stage chlorine dioxide-extraction sequence. All chlorine dioxide stages were conducted with gaseous chlorine dioxide. The pulp was tumbled in a 3 gallon polyethylene reactor during the reaction period. A total of 8.4 percent chlorine dioxide (wood basis) was consumed by the pulp. All chlorine dioxide stages were conducted at room temperature without addition of buffer.

The processed pulp was beaten 11 minutes to 300 ml. Canadian Standard Freeness (TAPPI Standard T227 m-58) in a Valley beater. Three cation treated series of handsheets were made and one series was made with just distilled water. The treated handsheets were made by applying 1.2 gram of the salt or base of interest to a slurry containing 12 grams of pulp (oven dry basis). Sufficient slurry was then added to the handsheet mold (using distilled water) to make a standard 1.2 gram handsheet. Cations selected were sodium in the form of sodium hydroxide, lead in the form of lead acetate, aluminum in the form of aluminum sulfate, and the control which was made from distilled water.

Figure 10:
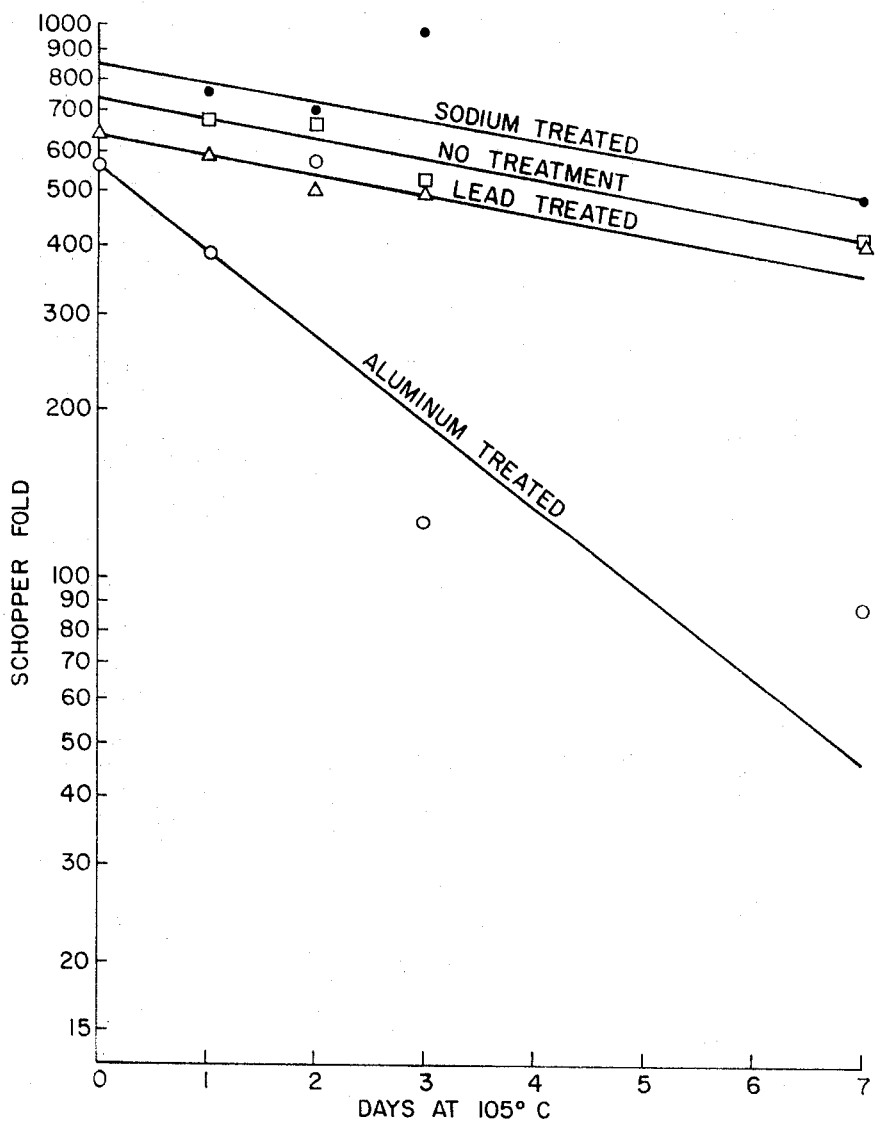

Pairs of handsheets from the four groups were aged at 105° C. for zero days, one day, two days, three days and seven days. Each handsheet was then cut into four strips and tested to failure in the Schopper fold tester. All strips were, of course, conditioned in the test laboratory prior to testing. The data obtained is presented in the table below and in FIG. 10.

| | Schopper fold values | | | |
|---|---|---|---|---|
| | | Chemical treatment | | |
| Aging, days at 105° C. | No chemical treatment | Sodium hydroxide | Lead acetate | Aluminum sulfate |
| Zero | | 864 | 643 | 557 |
| One | 675 | 779 | 593 | 391 |
| Two | 659 | 713 | 505 | [1] 685 |
| Three | 535 | [1] 988 | 507 | 128 |
| Seven | 406 | 492 | 401 | 89 |

[1] These values out of line with other values.

Figure 11:
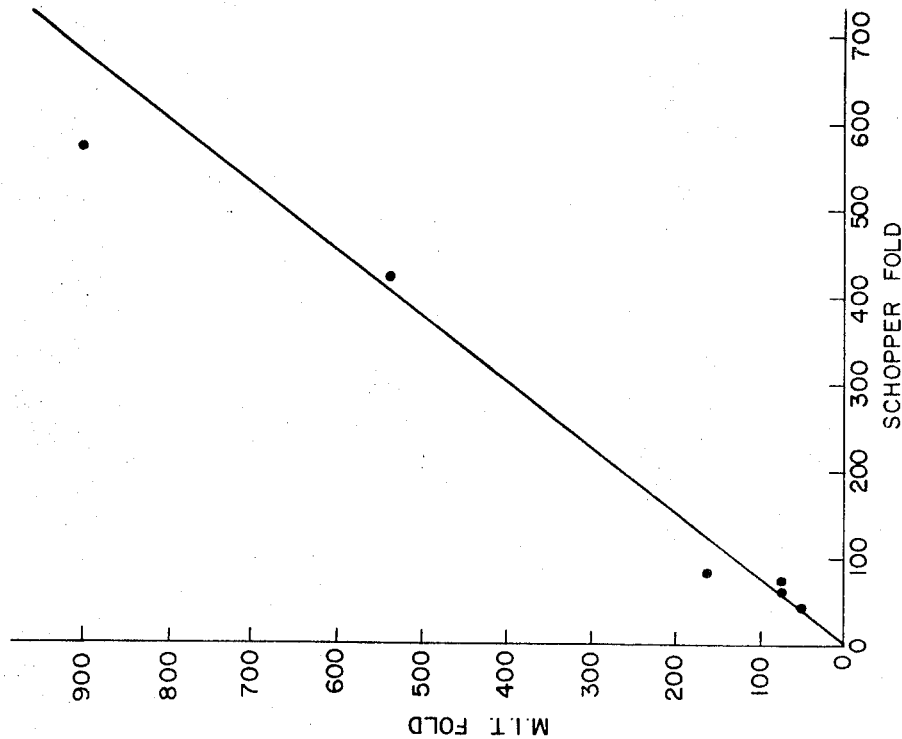

FIG. 11 develops the relationship between M.I.T. and Schopper folds, based on data on pulp of the present invention tested according to both methods.

Figure 12:
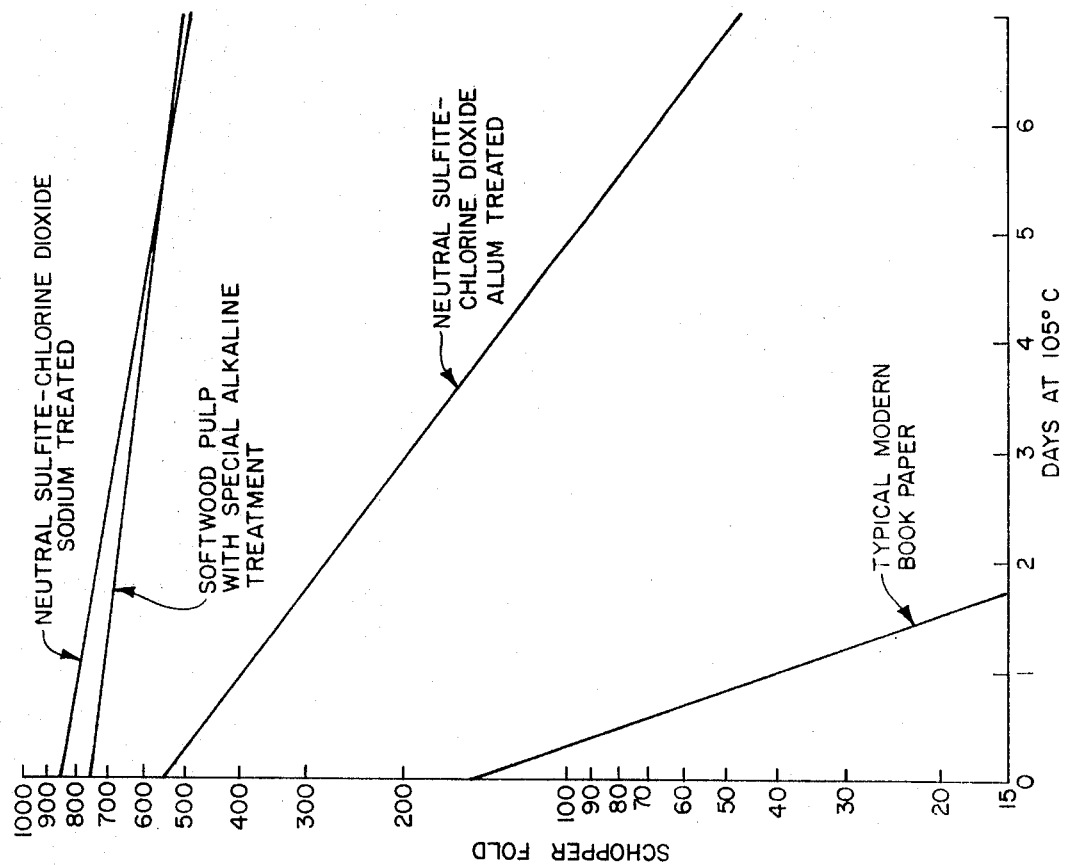

From FIG. 12 of the drawings it is evident that typical book paper which has been treated with alum degrades most rapidly. Neutral sulfite-chlorine dioxide pulp which has been exchanged with aluminum ions from alum degrades less rapidly. The neutral sulfite-chlorine dioxide pulp which has been exchanged with sodium is very resistant to fold loss. The last curve represents the behavior of a special long fiber softwood pulp treated with alkali to develope its high degree of permanence. The neutral sulfite-chlorine dioxide pulp with sodium treatment (or no treatment) is almost as durable as the special pulp. Even with alum treatment the neutral sulfite-chlorine dioxide pulp is much more durable than modern book paper.

Figure 13:
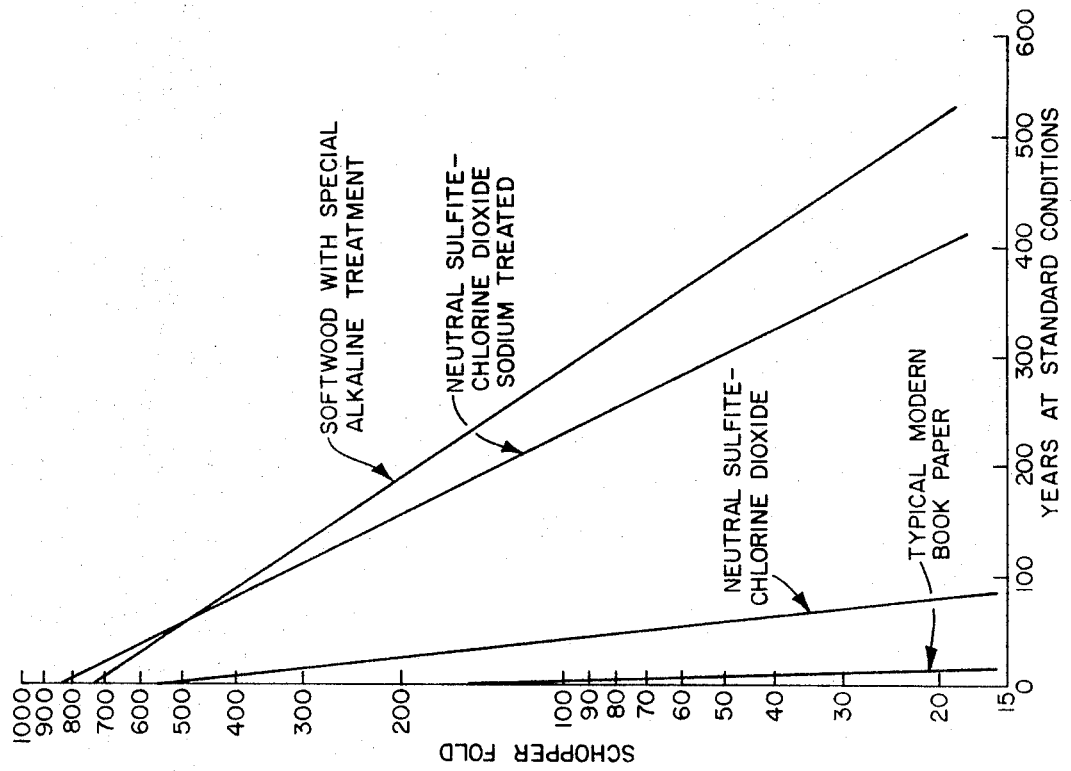

In FIG. 13 of the drawings the same pulps are compared with respect to their fold durability on the basis of years at standard conditions. The half life (the time in years required to decrease the fold to one half of its original value) of the neutral sulfite-chlorine dioxide pulps is very high compared to conventional book. The half life of the neutral sulfite-chlorine dioxide alum treated pulp is about 18 years. The typical modern book paper has a half life of about 6 years.

From the above data it is concluded that the neutral sulfite-chlorine dioxide pulp of the present invention without special treatment or with lead or sodium treatment is very durable. Alum treated neutral sulfite-chlorine dioxide pulp is less durable than the lead, sodium or no-treatment pulps but is more durable than typical alum treated book paper.

What is claimed is:
1. A process for the delignification of vegetable matter comprising, in combination, the steps of:
   (a) pretreating said vegetable matter to obtain a refined vegetable matter in a yield of about 64% to about 100% by weight, based upon the dry weight of said vegetable matter;
   (b) reacting said refined vegetable matter with at least about 2% to about 15% chlorine dioxide;
   (c) treating said vegetable matter with a water-soluble caustic material at a temperature of from about 50° C. to about 75° C; wherein said water soluble material is an alkali metal hydroxide, alkali metal carbonate, ammonium hydroxide or ammonia gas; and
   (d) reacting said vegetable matter with chlorine dioxide.
2. The process of claim 1 wherein said reacting following said pretreatment comprises, sequentially, chlorine dioxide treatment, water wash, caustic extraction, water wash, chlorine dioxide treatment, water wash, caustic extraction, water wash, chlorine dioxide treatment, and water wash.

3. The process of claim 2 wherein said water-soluble caustic material is sodium hydroxide or sodium carbonate.

4. The process of claim 2 wherein said caustic material is sodium hydroxide in aqueous solution.

5. The process of claim 2 wherein said pretreating is substantially a mechanical operation.

6. The process of claim 2 wherein said pretreating is a chemical prepulping treatment selected from the group consisting of sodium sulfide prepulping, acid sulfite prepulping, cold soda prepulping, soda prepulping, sodium xylene sulfonate prepulping, bisulfite prepulping, kraft prepulping and nitric acid prepulping.

7. The process of claim 2 wherein said pretreating includes, in combination, the steps of:
(i) prepulping prepared vegetable matter chips by a kraft, nitric acid, bisulfite, or neutral sulfite process;
(ii) refining said prepulped vegetable matter;
(iii) washing said prepulped vegetable matter; and
(iv) dewatering said prepulped vegetable matter.

8. The process of claim 7 wherein said chips of vegetable matter are prepulped by a process comprising contacting said vegetable matter with from about 5% to about 30% sodium sulfite by weight and from about 3% to about 25% sodium carbonate by weight, both percentages being based upon the dry weight of said vegetable matter.

9. The process of claim 2 wherein the pH of the mixture of vegetable matter and chlorine dioxide of step (b) varies up to about 8.0.

10. The process of claim 2 wherein said vegetable matter is treated with about 4% of said water-soluble caustic material and the total concentration of chlorine dioxide used is from about 1% to about 15% by weight, all percentages being based on the total dry weight of said vegetable matter fed to the pretreating stage.

11. The process of claim 2 wherein the temperature of the mixture of said vegetable matter and said chlorine dioxide of step (d) is adjusted to from about 40° C. to about 60° C.

12. The process of claim 2 wherein fresh water is fed only to the last water washing step and then circulated countercurrently to the flow of said vegetable matter to the next to last water washing, to the next preceding washing, and finally to the first water washing.

13. The process of claim 2 wherein said chlorine dioxide is a mixture of chlorine dioxide and chlorine wherein said chlorine is less than about 30% by weight of the total chlorine dioxide requirement on equivalent oxidant basis.

14. A process for the delignification of vegetable matter comprising, in combination, the steps of:
(a) pretreating said vegetable matter to obtain a refined vegetable matter in a yield of about 64% to about 95% by weight, based upon the dry weight of said vegetable matter, said pretreating comprising, in combination, the steps of:
(i) prepulping prepared vegetable matter chips by kraft, nitric acid, bisulfite, or neutral sulfite process,
(ii) refining said prepulped vegetable matter,
(iii) washing said prepulped vegetable matter;
(b) reacting said refined vegetable matter with from about 2% to about 7% chlorine dioxide, based upon the total weight of dry fibrous material fed to said pretreating step until all of said chlorine dioxide is substantially consumed;
(c) water washing said reacted vegetable matter;
(d) treating said washed vegetable matter with an aqueous solution of sodium hydroxide for at least about one-half hour at a temperature of from about 50° C. to about 75° C.;
(e) water washing said treated vegetable matter;
(f) reacting said washed vegetable matter with about one-half the amount of chlorine dioxide used in step (b) at a temperature of from about 40° C. to about 60° C. for about 30 minutes to about 4 hours;
(g) water washing said reacted vegetable matter;
(h) treating said washed vegetable matter with sodium hydroxide in aqueous solution for at least about one-half hour at a temperature of from about 50° C. to about 75° C.;
(i) water washing said caustic treated vegetable matter;
(j) reacting said washed vegetable matter with about one-half the amount of chlorine dioxide used in step (f) for a period of from about 2 hours to about 6 hours at a temperature of from about 40° C. to about 80° C.; and
(k) water washing said reacted vegetable matter.

15. The process of claim 14 wherein said chips of vegetable matter are prepulped by a process comprising contacting said vegetable matter with from about 5% to about 30% sodium sulfite by weight and from about 3% to about 25% sodium carbonate by weight, both percentages being based upon the dry weight of said vegetable matter.

16. The process of claim 15 wherein said washed vegetable matter is treated with about 4% of said water-soluble caustic material and the total concentration of said chlorine dioxide used is from about 1% to about 15% by weight, all percentages being based on the total dry weight of said vegetable matter fed to the pretreating stage.

17. The process of claim 16 wherein the pH of said mixture of vegetable matter and chlorine dioxide of step (b) varies up to about 8.0.

18. The process of claim 17 wherein the pH of said mixture of vegetable matter and chlorine dioxide of step (f) varies from about 4.0 to about 8.0 at the beginning of the reaction and is about 2.0 upon consumption of said chlorine dioxide.

19. A pulp produced by the process of claim 1.

20. A paper prepared from the pulp of claim 19.

21. A paper made predominantly from softwood pulp produced by the process of claim 14 wherein the grease-proofness is greater than 500, the tensile strength is greater than 120%, the bursting strength is greater than 160%, the tear resistance is greater than 320%, and the folding endurance is greater than 1000.

22. A paper made predominantly from hardwood pulp produced by the process of claim 14 wherein the grease-proofness is greater than 500, the tensile strength is greater than 80%, the bursting strength is greater than 140%, the tear resistance is greater than 160%, and the folding endurance is greater than 500.

References Cited
UNITED STATES PATENTS

| | | | |
|---|---|---|---|
| 2,882,965 | 4/1959 | Wayman et al. | 162—89 |
| 3,020,197 | 2/1962 | Schuber | 162—89X |
| 3,433,702 | 3/1969 | Jack et al. | 162—88X |
| 3,501,374 | 3/1970 | Jack et al. | 162—89 |

OTHER REFERENCES

Casey, Pulp & Paper, 2nd ed., vol. I, 1960, p. 102.

HOWARD R. CAINE, Primary Examiner

U.S. Cl. X.R.

162—89

UNITED STATES PATENT OFFICE
CERTIFICATE OF CORRECTION

Patent No. 3,591,451             Dated 7-6-71

Inventor(s)  Harry D. Wilder

It is certified that error appears in the above-identified patent and that said Letters Patent are hereby corrected as shown below:

Column 4, line 2, "ercent" should read --percent--.
Column 4, line 73, "preteated" should read --pretreated--.
Column 8, line 41, "100" should read --1000--.
Column 8, line 44, "1500" should read --2000--.
Column 8, line numbered 74, "condtions" should read --conditions--
Column 9, line numbered 31, "of" (first occurrence) should read
            --or--.
Column 12, the column of figures at the left end of the table
            in lines numbered 45-54, should read
                        --61
                          62
                          63
                          70
                          71
                          86--.
Column 14, in the table that extends across to column 13, the
            subtitle of the right-hand column of data
            should read--Tear,
                        percent--.
Column 14, line numbered 26, "strentghs" should read--strengths--
Column 14, line numbered 62, "uisng" should read --using--.
Column 15, line numbered 56, each "48" should be --148--.
Column 15, in footnote 1 to the table at the very bottom of the
            page, "355°F" should read --335°F--.
Column 16, in the table at the very bottom of the page the
            heading "Percent
                    chlorine
                    (wood
                     basis)" should read --Percent
                                            chlorine
                                            dioxide
                                            (wood
            (continued)          .           basis)--

FORM PO-1050 (10-69)

UNITED STATES PATENT OFFICE
CERTIFICATE OF CORRECTION

Patent No. 3,591,451          Dated 7-6-71

Inventor(s) Harry D. Wilder

It is certified that error appears in the above-identified patent and that said Letters Patent are hereby corrected as shown below:

Column 22, line numbered 34, ".3" should read --65.3--.
Column 22, just below the table in lines numbered 45-51, the following footnotes should appear:
--[1]TAPPI Standard T215 m-50.
[2]TAPPI Standard T237 su-63.--

Column 15, line numbered 50, "Percent dioxide" should read --Percent chlorine dioxide--.

Signed and sealed this 24th day of April 1973.

(SEAL)
Attest:

EDWARD M. FLETCHER, JR.
Attesting Officer

ROBERT GOTTSCHALK
Commissioner of Patents